(12) United States Patent
Shimshoni et al.

(10) Patent No.: US 9,043,302 B1
(45) Date of Patent: May 26, 2015

(54) CAMPAIGN AND COMPETITIVE ANALYSIS AND DATA VISUALIZATION BASED ON SEARCH INTEREST DATA

(71) Applicant: Google Inc., Mountain View, CA (US)

(72) Inventors: Yair Shimshoni, Hod-Hashron (IL); Niv Efron, Rishon le-Zion (IL); Michael Fink, Jerusalem (IL); Eyal Segalis, Tel Aviv (IL); Brian Patton, London (GB); Michal Levin, Palo Alto, CA (US); Michal Neufeld, Ramat Gan (IL); Nir Bar-Lev, Ramat Gan (IL); Yossi Matias, Tel Aviv (IL); Nimrod Tamir, Tel Aviv (IL)

(73) Assignee: Google Inc., Mountain View, CA (US)

( * ) Notice: Subject to any disclaimer, the term of this patent is extended or adjusted under 35 U.S.C. 154(b) by 189 days.

(21) Appl. No.: 13/843,318

(22) Filed: Mar. 15, 2013

Related U.S. Application Data

(60) Provisional application No. 61/675,774, filed on Jul. 25, 2012.

(51) Int. Cl.
 *G06F 17/30* (2006.01)
 *G06F 7/00* (2006.01)
(52) U.S. Cl.
 CPC .............................. *G06F 17/30864* (2013.01)

(58) Field of Classification Search
 USPC ........................................................ 707/706
 See application file for complete search history.

(56) References Cited

U.S. PATENT DOCUMENTS

| 7,577,643 | B2 | 8/2009 | Dominowska et al. | |
|---|---|---|---|---|
| 8,214,363 | B2 | 7/2012 | Chaudhary | |
| 8,402,031 | B2 | 3/2013 | Govani et al. | |
| 2004/0061702 | A1* | 4/2004 | Kincaid | 345/440 |
| 2008/0294630 | A1* | 11/2008 | Yan et al. | 707/5 |
| 2010/0082410 | A1* | 4/2010 | Baudin et al. | 705/10 |
| 2011/0119269 | A1 | 5/2011 | Agrawal et al. | |
| 2012/0317088 | A1 | 12/2012 | Pantel et al. | |
| 2013/0013248 | A1* | 1/2013 | Brugler et al. | 702/130 |

* cited by examiner

*Primary Examiner* — Kuen Lu
(74) *Attorney, Agent, or Firm* — Fish & Richardson P.C.

(57) ABSTRACT

Techniques for providing interactive visualizations for an entity or group of entities based on search interest data are provided. The search interest data may be derived from Internet or online search data related to the entities and relevant attributes of the entities. Each of the entities and attributes may be represented in a structured search market using a predefined list of relevant search terms or keywords. The search interest of each entity and attribute may be determined based on probabilities representing a likelihood of a search for an entity co-occurring with a search for a relevant attribute within a predetermined time proximity.

17 Claims, 21 Drawing Sheets

Market Model Editor

Create new campaign

1. Set Campaign Details    2. Define Campaign Keyword List    3. Review Campaign

Step 3: Review Campaign

Name:          test case 2
Time range:    01/01/2011 - 12/31/2011
Region:        Worldwide
Keyword list:  test list Discard campaign                    « Back    Add campaign    Add & Go to report ▸

CAMPAIGN AND COMPETITIVE ANALYSIS AND DATA VISUALIZATION BASED ON SEARCH INTEREST DATA

CROSS-REFERENCE TO RELATED APPLICATIONS

The present application claims priority benefit under 35 U.S.C. §119(e) from U.S. Provisional Application No. 61/675,774, filed Jul. 25, 2012, which is incorporated herein by reference in its entirety.

BACKGROUND

The present disclosure relates generally to data visualization, and, more particularly, to visualization of search interest data associated with various entities.

Market research has been used by advertisers, marketers and other groups to acquire more information about a particular market, market segment, or entity. For example, this research may be used to gauge consumer interest in particular brands, and how such interest may vary over time and across different geographic locations. However, conventional solutions for conducting research on consumer markets or product brands generally involve using customer polls or surveys including, for example, traditional surveys conducted on an ad hoc basis (e.g., via telephone or forms mailed to physical home addresses) or online surveys via web forms posted to web pages or an online discussion panel. However, such conventional solutions are expensive, time consuming and assume that the responses from customers provide an accurate reflection of their actual interest in a brand or entity for a given market. Moreover, the results of these traditional market surveys or customer polls are generally not available to the interested party (e.g., a particular business enterprise) until well after the initial time period when the research was conducted, and therefore, may be less relevant with respect to the current time period.

SUMMARY

The disclosed subject matter relates to visualizing information related to entities in an industry or market segment based on user search interest data.

In an example method, search parameters are identified for defining a structured search market based on input from a user. The search parameters include a first list of search terms representing one or more search entities and a second list of search terms representing one or more attributes for the one or more search entities in the first list. Aggregated online search query data is processed based on the identified search parameters of the structured search market. An interactive visualization of interrelations between the one or more search entities and the one or more attributes within the structured search market is provided based on the processed search query data.

In another example method, a historic trend of online search interest in a search entity is determined based on search queries related to the search entity submitted by users to a search engine during a first time period. The search entity corresponds to one or more related search terms submitted as part of the related search queries. A current trend of online search interest in the search entity is then determined based on search queries related to the search entity submitted during a second time period. An interactive visualization is provided, where the visualization compares the historic and current search trends of online search interest for the search entity over a time series including the first and second time periods.

In yet another example method for providing a visualization of search interest data for entities in a market, a search frequency for each entity in a list of entities in the market is determined based on an aggregate record of user search queries related to the entities within a predetermined time period. Each entity in the list of entities may be represented by a predefined list of search terms associated with the entity. Search probabilities are calculated for each of the entities based on the determined search frequency. The search probabilities indicate the likelihood of a search for each entity co-occurring with each of the search terms in the corresponding list of search terms associated with the entity. A user interest level for each of the entities is estimated based on the calculated search probabilities. A visualization of the estimated user interest level for each of the entities in the list of entities is then presented.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

FIGS. 10A-10C illustrate an example interface for modeling a real-world market based on search interest data in order to perform market campaign analysis.

DETAILED DESCRIPTION

I. Introduction

Figure 1:
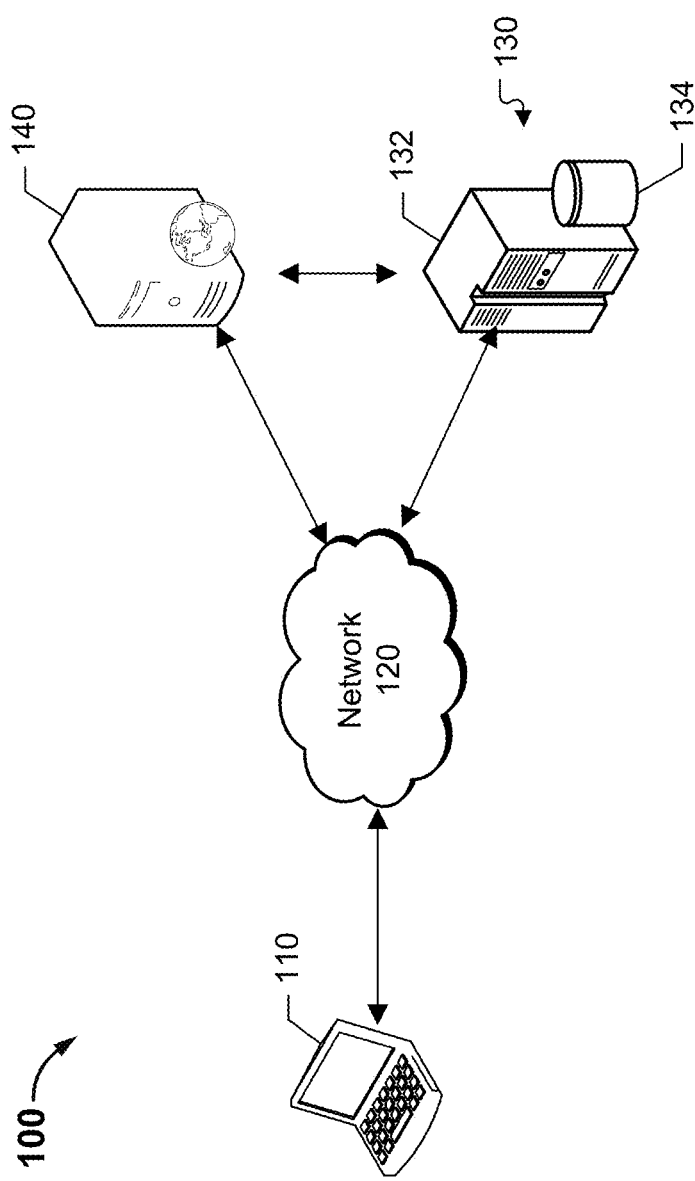
FIG. 1 is a diagram of an example network environment suitable for practicing an implementation of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The disclosed subject matter relates to providing interactive visualizations for an entity or group of entities based on search interest data derived from Internet or online search trends related to the entities. Examples of such entities may include, but are not limited to, stocks or other financial products, companies or businesses, health conditions or symptoms, movies, celebrities or artists, politicians or political parties, sports teams, etc. In an example, a real-world market or market segment may be modeled using web search data from search logs that provide an aggregate record of public search queries conducted over a period of time from many different web users. The web search data may be processed to discover online search trends or search interest, which may be representative of actual consumer interest in a particular brand or product category within a given real-world market. Interactive visualizations generated from the search interest data may be used by various interested parties to gain insights into a particular market or market segment. Examples of such interested parties may include, but are not limited to, professional product marketers or marketing agencies, brand managers or other groups of users who may be interested in obtaining additional information related to different brands within a market. Thus, a professional marketer or brand manager may use, for example, interactive visualizations generated from online search activity or trends related to particular brands and market attributes to analyze the effect of different marketing campaigns with respect to a given market or product category over time.

As will be described in further detail below, different types of interactive visualizations may be provided for market research and analysis so as to enable users (e.g., marketers and advertisers) to leverage search interest data for various business processes. Examples of such business processes may include, but are not limited to, processes to: (1) learn the structure of a given market; (2) define and measure the characteristics of different consumer brands with respect to particular market segments; (3) present information on market dynamics from different market viewpoints; (4) monitor and create alerts on changing trends for particular brands based on one or more predetermined thresholds; (5) analyze relative strengths and user perceptions of different brands; and (6) benchmark and compare brand and advertising or marketing campaign performance within a given market across different industries. Market research and analysis tools implementing such interactive visualizations provide a way to bridge the gap between conventional marketing research techniques (e.g., TV campaigns, users polls and traditional brand metrics) and the modern online marketing arena.

The terms "search interest" and "online interest" are used interchangeably herein to refer to a measure of the aggregate popularity of a search term or keyword (e.g., a brand name) among web search users (e.g., in a given location and time period). The aggregate popularity of a search term may be based on, for example, a relative or normalized search volume returned by a web search engine. The search volume is used herein to refer to the total count (or number of times) a search term/keyword (or synonym thereof) has been entered or queried in the search engine during a given period of time. This time period may be measured in any of various time increments as desired including, but not limited to, seconds, minutes, days, months or years. For example, the search volume or total count of queries including a particular search term occurring within a current time period may be indicative of the current level of search or online interest of that term. While many of the examples provided herein are described with respect to a single search engine, it should be noted that the subject technology as described herein may use search query data from multiple search engines. Additionally, while many of the examples provided herein are described in the context of a market and product brands, it should be noted that the subject technology is not intended to be limited thereto and that the techniques described herein may be applied to any search topic or category of interest based on search queries including one or more search terms entered/submitted by different users using a web search engine.

The term "attribute" may be used herein to refer groups of keywords, which may be predefine or defined by a user (e.g., a brand manager). Multiple attributes may be defined for a given market. For example, a user-defined attribute may include a title that can be used by an analytics data system as a reference name for identifying the attribute, as will be described in further detail below with respect to FIG. 1. Attributes may also be grouped based on type, which may be useful for managing lengthy list of attributes. Furthermore, an attribute can be any search interest entity that may represent general user interest, experience, associations, attitudes or sentiments with respect to a given brand. An attribute may also be used to represent generic product names or other product-related information, where the attribute may reference an aggregated set of given keywords.

As noted above, search interest data based on online search trends related to one or more search terms or keywords may be used as a proxy for user interest with respect to a particular subject or search topic related to the search terms. In the context of a consumer market, modern consumers who are "in the market" to purchase a particular product tend to rely on online search query results from a web search engine as a primary source of information regarding different products or product brands of interest. Thus, aggregated search logs representing, for example, a relatively large volume of search queries submitted by a large number of different web users over a period of time may be used to extract information relating to the search interest of a particular brand or other entity in a given market. The search interest for a brand may provide, for example, a relatively good approximation of overall consumer interest for the brand in a given real-world market or market segment. Furthermore, aggregated search interest data for different brands may be integrated into search interest metrics that can be used to gain market insights into the various interrelations between the brands and how such interrelations may impact various business decisions including, but not limited to, decisions for advertising, product branding and positioning strategy, market analysis, etc.

II. Example Network Environment

In an example network environment 100 illustrated in FIG. 1, a data system 130 may be used to monitor and track general online activity. Such online activity may include, for example and without limitation, web site traffic associated with one or more public web pages or a web search engine. In some implementations, data system 130 may be configured to process high volumes of public search queries entered or submitted by different web users (not shown) via an interface of a search engine over time. For example, the interface of the web search engine may be provided by web server 140 as a web page displayed in a web browser executing at each of the users' respective computing devices. In operation, each user may interact with various user interface elements (e.g., a text field) of the search engine interface to specify and submit search queries via the web browser. The user search queries may be sent by the web browser to web server 140 through network 120. It should be noted that any online data collected through such interface generally does not include any information that can be used to identify an individual web user. As such, user search queries are made to be anonymous by, for example, removing any information that could be used to identify an individual user. However, the user may provide explicit authorization allowing user-specific information (e.g., demographics of the particular user) related to a search query submitted by the user to be logged with the search query. In some aspects, the web site or search engine may allow users to create a personal account or public profile in which the user may provide such authorization, e.g., as part of a privacy setting established for particular user-specified content or data items associated with the user's account or profile. As such, the user may be able to customize the privacy settings for different content in order to grant prior authorization or approval for allowing particular information or content publicly available or identifiable with the user, while keeping other information private or anonymous.

As illustrated in the example of FIG. 1, data system 130 is communicatively coupled to web server 140 and a client device 110 (or "client 110") via network 120. Network 120 can be any network or combination of networks that can carry data communication. Such a network can include, but is not limited to, a cellular network, a local area network, medium area network, and/or wide area network such as the Internet, or a combination thereof for communicatively coupling any number of mobile clients, fixed clients, and servers. Data system 130 includes a server 132, which may be configured to report statistical information based on processed web search traffic data received from web server 140 or other computing devices through network 120. Client 110 may be associated with, for example, a product marketer, brand manager, advertiser or publisher interested in acquiring information related to search trends related to consumer products in a particular market (e.g., market trend information based on search interest data) reported by data system 130. Client 110 can be any type of computing device with at least one processor, local memory, display, and one or more input devices (e.g., a mouse, QWERTY keyboard, touch-screen or microphone). Examples of different computing devices that may be used to implement client 110 include, but are not limited to, a desktop computer, a laptop computer, a handheld computer, a personal digital assistant (PDA), a network appliance, a mobile handset or smart phone, a tablet computer or a combination of any these data processing devices or other data processing devices. Similarly, each of servers 132 and 140 can be implemented using any general-purpose computer capable of serving data to client 110 through network 120. Examples of different computing devices that may be used to implement each of servers 132 and 140 include, but are not limited to, a web server, an application server, a proxy server, a network server, or a group of computing devices in a server farm.

The data system 130 aggregates and reports search query tracking data (also referred to herein as "tracking data") based on search engine traffic over a period of time. In some implementations, server 132 performs automated segmenting of tracking data included in an event tracking data communication over a rolling window of time or time series. Such tracking data may include, for example and without limitation, a user identifier, an event data, e.g., a timestamp of the current web page event tracking data communication, and user data, e.g., city or other geographical location of the user. Server 132 may perform various operations on the event tracking data including, but not limited to: (1) segmenting the event tracking data according to one or more predetermined time periods; and (2) storing the tracking data using one or more table(s) in a database or data store 134 for later retrieval in a database or data store 134 for later retrieval. Server 132 may also be configured to perform an additional operation(s) on the segmented data, such as continually sorting the segments of tracking data within each of the tables to report the top segments of the tracking data from those tables. In some implementations, server 132 may be configured to receive the event tracking data and perform the aforementioned operations in real-time.

As will be described in further detail below, a marketing agent or brand manager may provide a list of keywords to be tracked along with other tracking instructions via one or more interfaces provided by data system 130 at the brand manager's computing device (e.g., client 110) via network 120. The data that is tracked and collected may be related to one or more different user sessions, during which relevant data is captured or logged based on the provided tracking instructions and sent back to server 132132 in the form of an event tracking data communication for processing. The event tracking data communication may be sent, for example, as part of a Hypertext Transfer Protocol (HTTP) request.

In an example of tracking search queries, web server 140 may be configured to perform a logging function to log network traffic related to relevant search queries submitted by users via the web search engine. Further, data system 130 may be configured to sample and aggregate web search queries from search logs returned by the web server 140. Additionally, data system 130 may aggregate search data from multiple sources including, for example, multiple web search engines. The aggregated search data then may be processed by data system 130 in order to determine the frequency or total number of times a particular term or keyword (or synonym thereof) is entered or queried by web users in general (e.g., the search volume of the term) during a predetermined time period. As described above, this time period may be measured in any of various time increments as desired including, but not limited to, seconds, minutes, days, months or years.

In some implementations, data system 130 may use the determined search frequency of a term/keyword during the predetermined time period to estimate the overall search interest for the term among users in general during that time period. Further, data system 130 may be configured to identify "co-occurrences" of different search queries within a predetermined time proximity of one another. As will be described in further detail below, some of these search queries may be for one or more search terms or keywords associated with a particular entity of interest and the other query may be for an attribute associated with that entity or category/type of entity. Searches that co-occur within a predetermined time proximity or relatively period of short time (e.g., few seconds) of each other may be referred to herein as sharing a search context (or "context") or as occurring within the same user session (or "mini-session"). A session or mini-session may correspond to, for example, a set of search queries submitted by a user in the same context. The start of a mini-session may coincide with, for example, the input of a first search query by the user. In some implementations, a heuristic algorithm may be used to determine the end of the mini-session as a function of the respective content and time difference between consecutive queries entered by the same user. Search data for such co-occurrences or "co-searches" (e.g., different searches sharing the same context) may provide an aggregate representation of users' search interest with respect to different entities (e.g., brands in a consumer market) and their corresponding attributes (e.g., brand or product attributes). For example, in the context of a consumer market, this data may be useful in conveying information regarding the competitive landscape of different brands in a given market. Further, the data may provide some indication of general user preferences or potential consumer trends related to the purchase of products or services with respect to the various brands in the market.

In addition to the time period or range, other types of data filters may be applied to the search interest data in order to extract search interest metrics for a target population or segment of the market. As such, the choice of filters help to define the target population or market segment. Examples of other data filters may include, but are not limited to, search term categories that may represent different vertical markets (e.g., automotive, entertainment, food and drink, etc.), geographic regions or locations (e.g., countries, states, cities or other designated geographic areas) and search query properties defining the source(s) of information to be searched. Examples of different sources of information may include, but are not limited to, images or videos in an online media file repository, news sources and product databases as well as discussion forums, blogs, information related to one or more social networking sites or services and other user content sources. As will be described in further detail below with respect to FIGS. 2A-2C, the relevant time period and other data filters may be defined by a user via an interface provided by data system 130.

Data system 130 in combination with web server 140 may be implemented as, for example, a multi-tiered real-time analytics system for monitoring and reporting web search traffic data in the form of event tracking data communications, as described above. Such a multi-tiered real-time analytics system may include different processing tiers for implementing various functionality within the system. Examples of the various functions that may be performed by different processing tiers may include, but are not limited to, collecting and logging search data, storing the data in persistent storage and processing the stored data for real-time analytics. Although the processing tiers of such a multi-tiered real-time analytics system are described herein using data system 130 and web server 140, each of the aforementioned tiers may be implemented using a cluster of servers/computers that perform a same set of functions in a distributed and/or load balanced manner. A cluster can be understood as a group of servers/computers that are linked together to seamlessly perform the same set of functions, which can provide performance, reliability and availability advantages over a single server/computer architecture.

In an example implementation of a multi-tiered real-time analytics system, web server 140 may be used to implement the aforementioned data collection and logging tiers of the system. For example, the received data communications based on user search queries may be collected at web server 140 and routed to data system 130 for persistent and temporary storage at data store 134 to enable the real-time analytics processing by server 132 or other servers in the system. The operations performed by data system 130 may include reporting (e.g., in real-time) search interest data for a particular market according to one or more predetermined criteria. As will be described in further detail below, the reporting functionality of data system 130 may include providing various interactive visualizations based on a structured search market defined in part by a list of entities of interest (e.g., competing brands) within a given market in addition to a list of search interest attributes for the entities.

III. Example Method for Brand and Campaign Analysis

Figure 2:
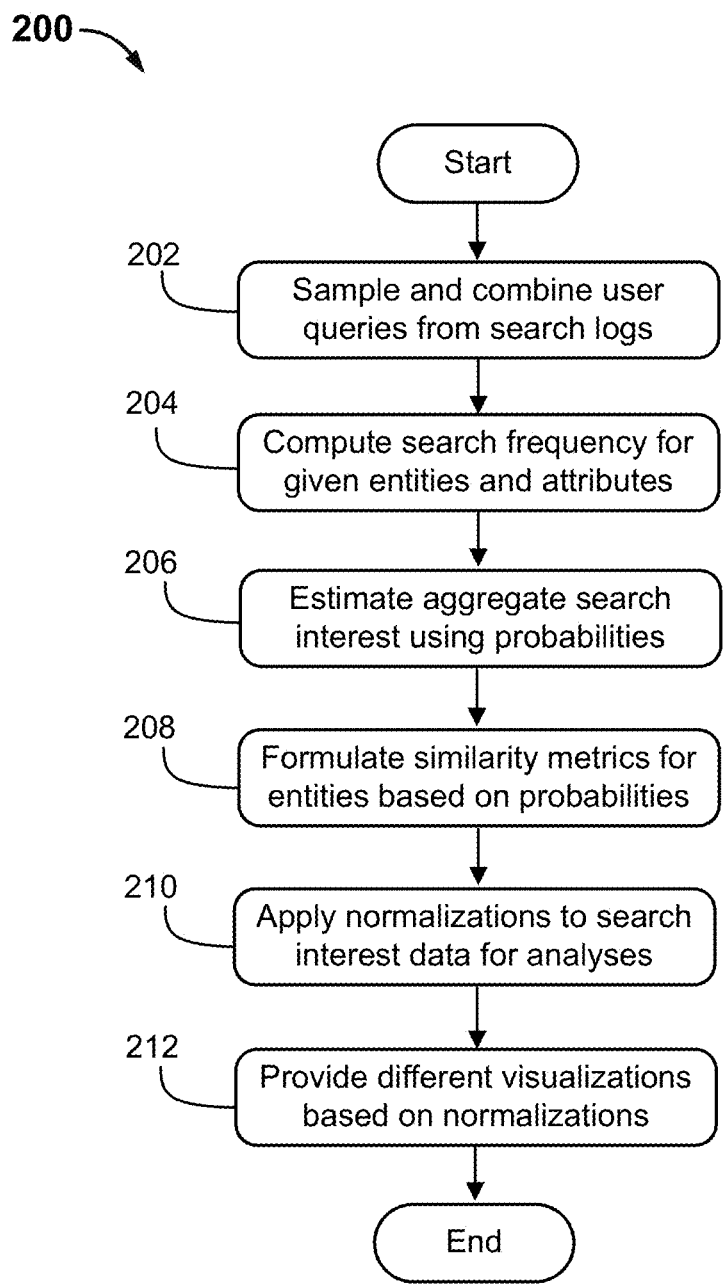
FIG. 2 illustrates a process flowchart of an example method for market analysis and visualization of information for different market entities related to a real-world market based on search interest data.

FIG. 2 is a process flowchart of an example method 200 for providing interactive visualizations for analysis of different brands in a given market or analysis of different advertising or marketing campaigns related to the market or segment of the market. As described above, the visualizations may be based on aggregated search interest data associated with a structured search market, as noted above. For purposes of discussion, method 200 will be described using network environment 100 (including client 110 and data system 130) of FIG. 1, as described above. However, method 200 is not intended to be limited thereto. For example, method 200 may be implemented in data system 130 of FIG. 1 for processing search interest data as part of a structured search market or predefined market model and providing interactive visualizations based on the processing, as will be described in further detail below. Further, the interactive visualizations may be presented to, for example, a brand manager associated with client 110 of FIG. 1 for facilitating market research including brand and campaign analysis.

As shown by the example in FIG. 2, method 200 begins in step 202, which includes sampling and aggregating user search queries from search logs. As described above, the search logs may be aggregated by an analytics data system (e.g., data system 130 of FIG. 1, as described above). The search log may include, for example, a large number of search queries entered by various users into a web search engine. For example, an interface of the web search engine may be provided by a web server (e.g., web server 140 of FIG. 1) of the data system over a network (e.g., network 120). As such, the data system may monitor online search activity based on user search queries submitted via an interface of the web search engine or one or more other web search engines. The search data may be stored in a data repository or data store (e.g., data store 134 of FIG. 1) accessible to the data system.

The aggregated search query data (e.g., stored within the aforementioned data store) is used in step 204 to compute the frequency at which users search for given entities in addition to relevant attributes associated with the entities. Each entity may be represented by one or more lists of search terms. Additional lists of search terms may be used to represent the attributes for the entities. In some implementations, the respective lists for the entities and attributes may be prepopulated using a predefined set of search terms or keywords based on, for example, a category associated with the particular entities. Additionally or alternatively, the search terms for each list may be defined by the user (e.g., marketer or brand manager) via, for example, an interface (e.g., interface 300 of FIGS. 3A-3C or interface 1000A-C of FIGS. 10A-10C, as will be described further below), which may be provided by the data system. The user may also define the category for the entity via the interface. In some implementations, separate interfaces may be provided for brand analysis (e.g., interface 300 of FIGS. 3A-3C) and for campaign analysis (e.g., interface 1000A-C of FIGS. 10A-10C), as will be described in further detail below.

As described above, the list of search terms may represent an entity (e.g., a product brand) within a given market while a second list of terms may represent relevant attributes associated with the market entities. Examples of such entities may include, but are not limited to, stocks or other financial products, health conditions or symptoms, movies, celebrities or artists, politicians or political parties, sports teams, or other types of entities that may be represented using a set of search terms or keywords from user search queries. In the context of a consumer market for products or services, an entity may be a brand associated with a product or service in a given market. For example, the list of entities may be a list of brand names identified as major competitors in the given market. a predetermined number of the top brands competing for business within the given market. The top competitors in such a market may be determined according to, for example, market share or brand popularity. Further, each brand in the list of brands may correspond to a set of search terms, where each set may include, for example, well-known or popular variations (e.g., including any known or frequent misspellings) of the brand name. If applicable, the various competitors may be categorized into a predetermined number of market categories (e.g., Manufactures, Online Vendors, Retail Chains, etc.). In some other markets, brands can be categorized as Domestic, Imported, etc., if such categorization would be appropriate. It should be noted that brand categories may be defined as desired by the user (e.g., brand manager). Thus, the list of competing brands can be defined according to, for example, a specific marketing use case or based on a specific brand.

The second list of attributes in this example may include a list of relevant search terms for the given market. Like the first list, the search terms in the second list may be grouped into different sets of terms corresponding to popular or common variations of the same attribute. The length or granularity of each list may be adjusted as desired by the user (e.g., brand manager). In an example, the attributes may be defined by the user as groups of keywords. As described above, one or more of the attributes may share the same context with a given brand in an underlying market. For example, it may be determined that a search query including one or more search terms corresponding to a brand attribute shares a context with a search query corresponding to the brand (e.g., search of the brand name) based on whether these searches occur (or "co-occur") within a predetermined period of time (e.g., within a relatively short time proximity of one another).

The search frequencies calculated in step 204 can be used in step 206, which includes estimating an aggregate web or online user search interest in the given entities and attributes. In some implementations, a statistical algorithm may be used to calculate probabilities and joint probabilities of occurrences of the respective search terms for the entities and attributes. The calculated probabilities may then be used to estimate users' search interest in general with respect to the given entities and attributes. Further, the estimated search interest based on the search terms may be restricted by geographic location and/or time frame. In the consumer market example, as described above, search interest data may be determined based on, for example, probabilities for estimating a likelihood of a search for a particular brand or brand name in a given market segment co-occurring with a search for a one or more relevant brand attributes (e.g., restricted by a given location and/or time frame). The search interest data also may be based on a likelihood of a search for a particular attribute in a given market segment co-occurring with a search for a particular brand or brand name.

Method 200 then proceeds to step 208, which includes formulating similarity/distance metrics based on the probabilities calculated as part of the search interest estimation in step 206. The formulated similarity metrics may represent the relative similarity between different entities in the given market, and thus, may be used as a proxy for relative similarities between the corresponding real-world entities. Further, search interest metrics derived from aggregated search logs may be used to model a real-world market, including the various entities within a real-world market, as described above. For example, aggregated search interest information with respect to various brands (e.g., in a given geographic location and time period) may be extracted and integrated into a set of brand metrics. The brand metrics for a given market may encapsulate interrelations between different brands in the market and thus, be used for general market analysis and research as well as an input for different business decision making processes related to, for example, developing targeted advertising or marketing campaigns as well as branding and positioning strategies. Examples of various metrics that may be calculated for all given brands may include, but are not limited to, mean search volume, volume growth, increases in search volume for different time frames, volume volatility, trends, seasonality, sudden volume spikes (e.g., corresponding to one or more outlier events) and geographical spread. Examples of search interest metrics will be described in further detail below using a number of equations or formulas for determining search probabilities based on different interrelations between various entities and/or attributes. However, it is noted that such equations/formulas are provided by way of example only and that the subject technology and techniques described herein are not intended to be limited thereto. Accordingly, any number of additional equations/formulas may be used as desired to calculate different search probabilities and interrelations between the various entities or attributes.

In some implementations, the similarity/distance metric is based on an overlap coefficient for determining a measure of similarity between two sets of search query data. The search query data in each set may correspond to, for example, search queries related to different product brands or brand attributes in a consumer market, as described above. Such a metric may be used, for example, to capture relevant associations between different search keywords (e.g., representing different brands or attributes) based on co-search data derived from aggregated user search queries. In an example, the distance or overlap between two brands ("brandA" and "brandB") in a given market may be defined in terms of search probability using equation (1) below:

$$1 - \frac{p(brandA, brandB)}{\min\{p(brandA), p(brandB)\}} \quad (1)$$

where p(brandA, brandB) represents the co-search probability for brandA and brandB within the same search query. user session or mini-session, and min{p(brandA), p(brandB)} represents the smaller of the two brands (or the brand having a relatively lower search probability). The distance metric derived from equation (1) in this example may be used to determine the portion of overlap between brands having different search volumes (e.g., small-scale vs. large), which may represent, for example, each brand's total market share or popularity in the given market.

In a further example, the market share of a brand may be defined as follows:

$$\frac{p(brandB)}{p(anybrand)} \quad (2)$$

The probability of the brand co-occurring in a search query with any other brand in the market may be defined as follows:

$$p(anyNonBbrand|brandB) \quad (3)$$

The volume of co-searches for a specific brand (e.g., brandB) out of the volume of co-searches of any of the brands may be defined as follows:

$$p(brandA|brandB, anyNonBbrand) \quad (4)$$

Further, the relative market share of the brand, when co-searched with a specific attribute X may be defined as follows:

$$\frac{p(brandB, attributeX)}{p(anybrand, attributeX)} \quad (5)$$

Similar equations to those provided above may be used to determine similar search probabilities for particular attributes. For example, the relative share of the attribute within any search market (e.g., co-searched with any of the brands) may be defined as follows:

$$\frac{p(attributeX, anybrand)}{p(anyattribute, anybrand)} \quad (6)$$

In an example, the search interest metrics may be used by a brand manager to discover a current trend in search interest for a brand, which may be included in a new promotional marketing campaign. The search interest trend related to the brand then may be compared with other trends during a predetermined time period relative to a baseline. The baseline may be established, for example, in terms of competing brands or with respect to the general market associated with the brand. Accordingly, new marketing campaigns may be devised or the existing campaign may be reformulated to account for any changing trends.

In step 210, different normalizations may be applied to the search interest and similarity metrics so as to provide, in step 212, different interactive visualizations based on the applied normalizations. The interactive visualizations may be provided for a given group of brands within a market segment. Further, the interactive visualizations may be used to show the interrelations and associations between relevant attributes within a given set of attributes for the brands. As such, the techniques utilized for such normalizations may be based on, for example, visualization requirements related to presenting a cross market view for comparing different brands in a given market or other requirements related to the market data analyses and visualizations to be provided in step 212 to the user.

Examples of different interactive visualizations may include, but are not limited to, multi-dimensional color presentations, various types of charts (e.g., bar graphs, bubble charts or stacked charts), heat maps. As will be described in further detail below, such interactive visualizations may be presented in multiple user-controlled dimensions based on one or more statistical analysis techniques including, but not limited to, Multi-Dimensional Scaling (MDS) and Clustering Analysis.

IV. Example Interfaces for Market Analysis Based on Search Interest Data

Figure 3A:
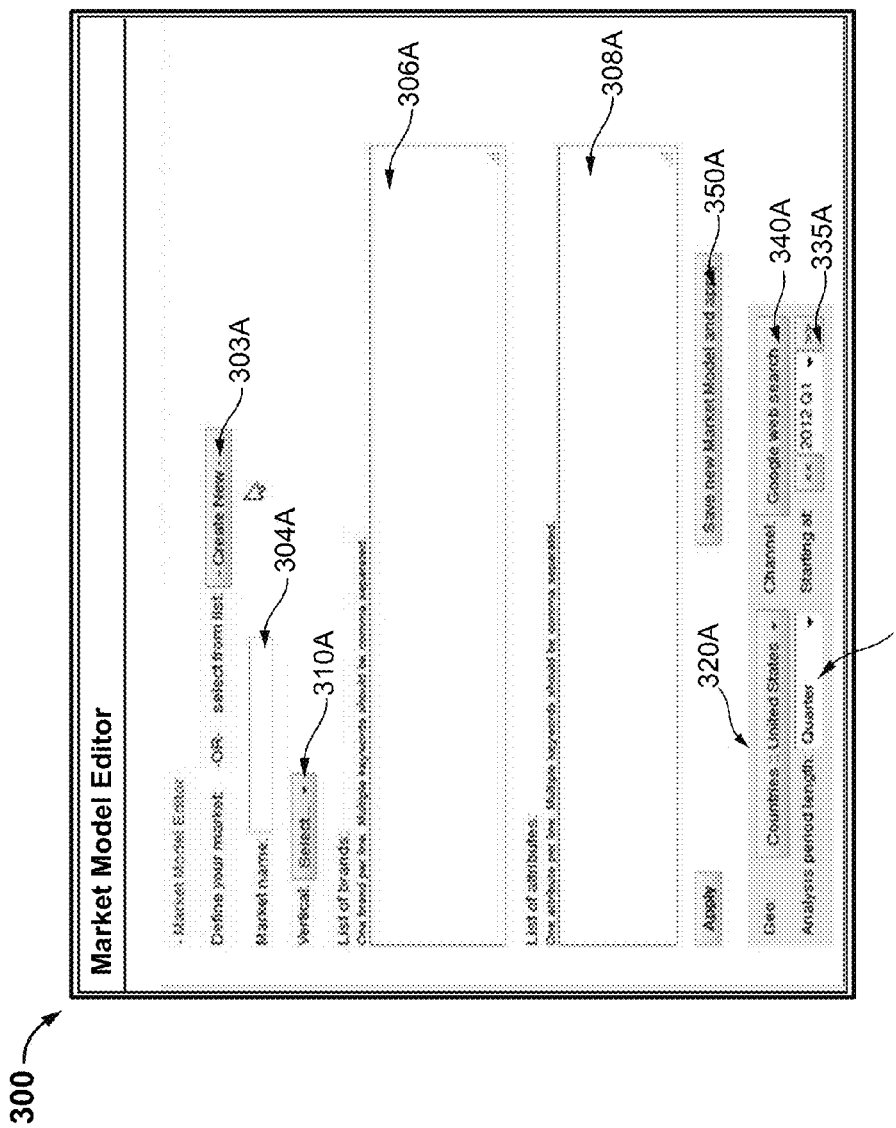
FIGS. 3A-3C illustrate an example interface for modeling a real-world market based on search interest data in order to perform brand analysis.
Figure 3B:
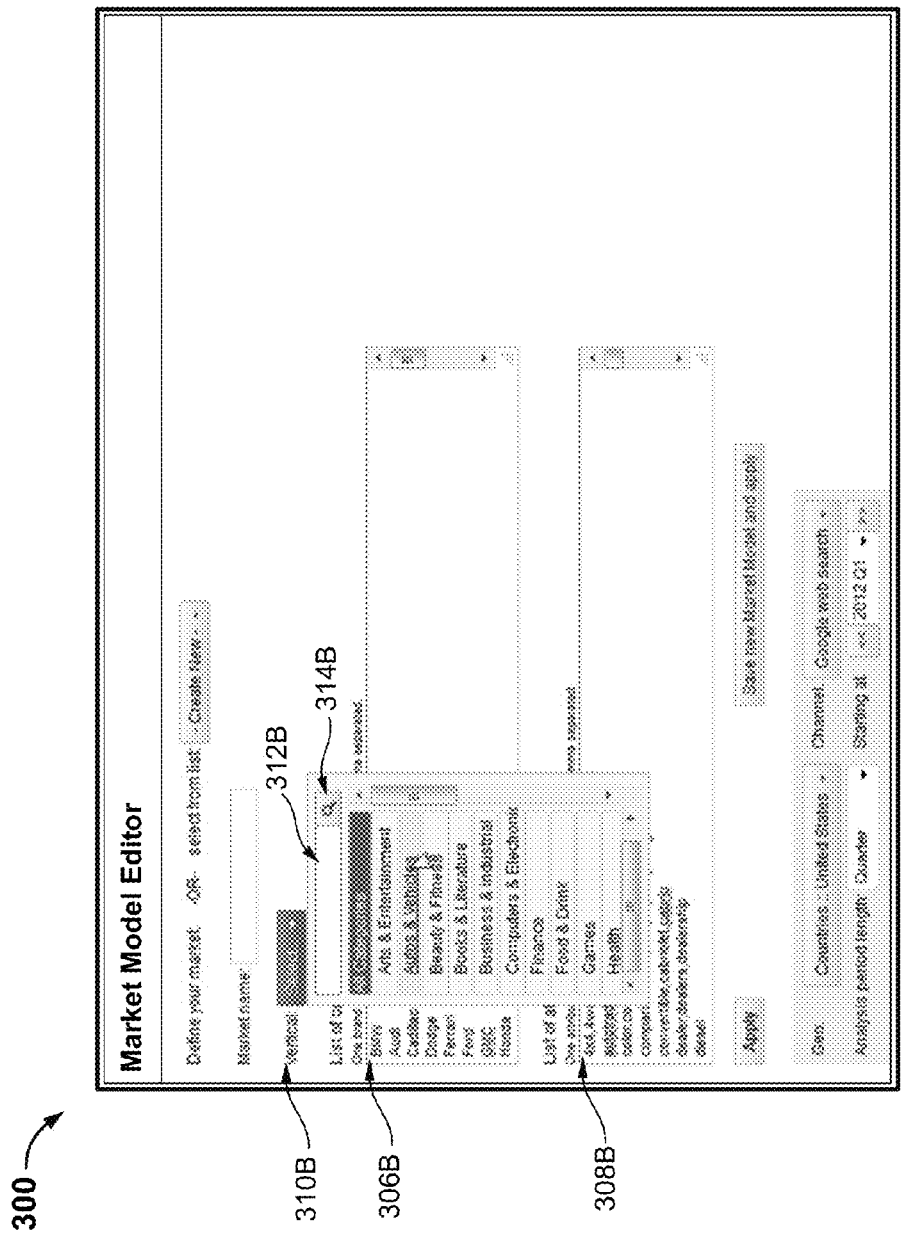
Figure 3C:
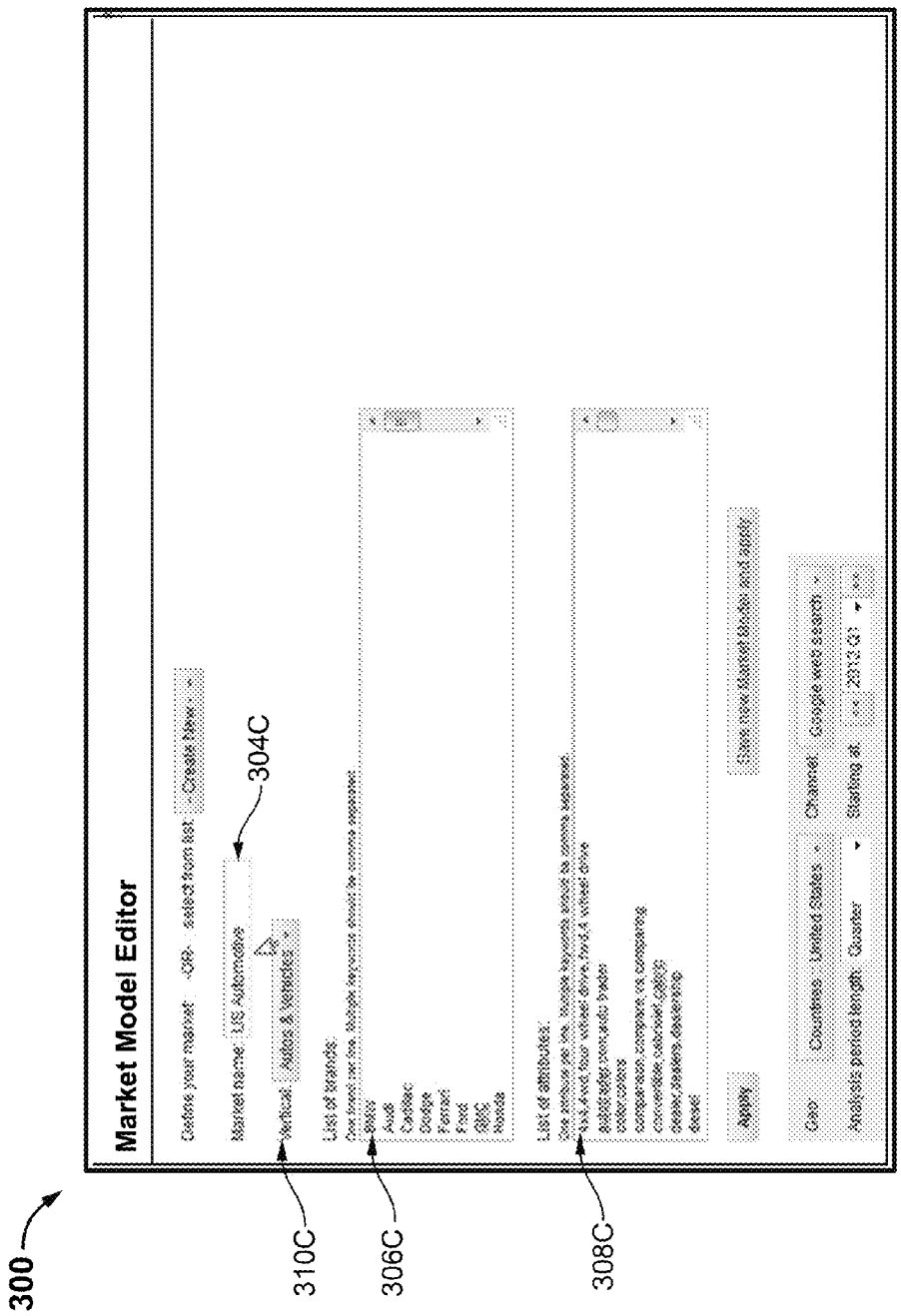

Initially, an example interface for defining a structured search market for modeling a given real-world market for purposes of brand analysis will be described with respect to FIGS. 3A-3C. In particular, FIGS. 3A-3C show an example implementation of an interface 300 that allows a user (e.g., a product marketer or brand manager) to define a structured search market (or "market model") that can be used to model a given real-world market or market segment for purposes of brand analysis, as described above. For purposes of discussion, interface 300 of FIGS. 3A-3C and the example visualizations of FIGS. 4A-4D, 5A-5C and 6-9 will be described in the context of, for example, the brand analysis portion of a set of tools for performing brand and campaign analysis and research for a given market or market segment.

Next, interface 1000A-C of FIGS. 10A-10C and the example visualization of FIG. 11 will be described in the context of the campaign analysis portion of these tools. For example, interface 300 and interface 1000A-C may be included as different interfaces within a set of market analysis tools. Further, interface 300 or interface 1000A-C may be used as part of the analysis toolset to define one or more market models using relevant keywords and to generate either standard or customized reports, including appropriate visualizations, for brand analysis or campaign analysis, respectively. In some implementations, interface 300 may include different user interface controls (not shown) for enabling a user, e.g., a brand manager, to switch between different tools for campaign analysis and brand analysis.

It should be noted that the example interfaces and interactive visualizations for brand analysis and campaign analysis, as noted above and as will be described in further detail below, are provided for illustrative purposes only, and that the subject technology described herein are not intended to be limited thereto.

V. Defining a Structured Search Market Model for Brand Analysis

Interface 300 includes various control elements within a portion of the interface (e.g., in an options or settings pane of a market model editing window, as shown in FIG. 3A) that a marketer or brand manager can use to input different parameters associated with a structured search market. In particular, the market model in this example may be defined primarily by search terms or keywords corresponding to a list of brands and a list of relevant brand attributes, as described above. For example, a brand manager may use interface 300 to create a new market model or make changes to an existing market model by selecting control button 302A. Control button 302A may be implemented, for example, as a list control element that can be selected and expanded to display a list of previously created market models. The brand manager can define a name for a newly market model by entering the name (e.g., in text format) into an input field 304A. For example, FIG. 3C shows a version of a portion of interface 300 in which the name "US Automotive" is specified for the market model via input field 304C. A control button 350A of interface 300 enables the brand manager to save a newly created market model with the specified name for later use. In the example interface 300 illustrated in FIG. 3A, the search terms or keywords for the list of brands and list of attributes may be defined by the brand manager via an input field 306A and an input field 308A, respectively. Input fields 306A and 308A may be implemented as, for example, text boxes allowing the brand manager to manually enter the search term/keywords via a user input device (e.g., keyboard) coupled to the computing device at which the interface is being provided.

In some implementations, interface 300 may provide predefined lists of brands and brand attributes for each of various market categories. The particular market categories provided by interface 300 may correspond to, for example, a predetermined number of popular vertical markets. The popular vertical market categories may have been previously identified or predetermined by, for example, analyzing and grouping popular or frequently submitted/entered user search queries into identifiable market categories. As shown in FIG. 3A, interface 300 may include a list control element 310A enabling the brand manager to select a market category from a predefined list of available market categories or search for a new market category via interface 300. For example, selection of list control element 310A may allow the brand manager to view an expanded list (e.g., expanded list control element 310B, as shown in FIG. 3B) or a pop-up window including the different market categories. The brand manager may define the market category for the new market model being created by selecting a market category as listed in an expanded list control element 310B, as shown in FIG. 3B. The expanded list control element 310B shown in FIG. 3B may be, for example, an expanded version of control element 310A of FIG. 3A. Additionally, the brand manager may search for additional market categories by entering a term or keyword related to a particular market or market category into an input field 312B of expanded list control element 310B. As shown in FIG. 3B, input field 312B includes a search button 314B that allows the brand manager to initiate a search for additional market categories based on the term or keyword entered into input field 312B.

In some implementations, selecting a market category from expanded list control element 310B automatically defines the market model being created via interface 300 with relevant search terms/keywords or other parameter values based on the selected market category. Further, interface 300 may be configured to automatically populate the user fields or control elements defining the parameters of the market model being created. In the example shown in FIG. 3B, selecting the "Autos & Vehicles" market category listed within the expanded list control element 310B may cause interface 300 to automatically populate each of input fields 306B and 308B with search terms/keywords from a predefined list of brands in addition to a predefined list of attributes, respectively, related to the particular market category. For example, FIG. 3C shows interface 300 in which the list of brands and the list of attributes are each pre-populated with a predefined set of search terms or keywords. The predefined list of brands may include, for example, a predetermined number of the top brands competing in the given market. The top brands may be identified based on, for example, the respective market share of each brand (e.g., based on revenue figures released by the manufacturer/provider of the products or services associated with each brand). Examples of keywords for brand attributes may include, but are not limited to, "Parts," "sports utility vehicle" (or "SUV"), "Performance," "Safety," "Engine," "Hybrid," "Trade-In," "Leasing," "anti-lock braking system" (or "ABS"), and other terms related to the automotive market or vehicles in general.

The number of brands to include in the list may be based on, for example, a level of granularity desired by the brand manager. Further, interface 300 may enable the brand manager to add other search terms or keywords (e.g., additional brand names) to the predefined list of brands or predefined list of attributes populated within input fields 306B and 308B. The ability to add keywords related to the market category may therefore allow the brand manager to further define the market model (e.g., with a higher degree of granularity). Although the examples illustrated in FIGS. 3A-3C and other examples provided herein may be described with respect to an automotive market or market category, the techniques described herein are not intended to be limited thereto and may be applied to any market or other relevant search interest category.

In addition to the above-described brand-related lists of search terms and market category, the brand manager in this example may use interface 300 to define additional parameters for the market model, which may be used as additional data filters for the search data, as described previously. Thus, interface 300 includes list control elements 320A, 330A, 335A and 340A, each of which correspond to a different search data filter or parameter that may be defined for the market model. While only list control elements 320A, 330A, 335A and 340A are shown, it should be noted that additional control elements corresponding to additional data filters or market model parameters may be used as desired. Like list control element 310A, the brand manager may select (e.g., via a user input device) any of these list control elements within interface 300 in order to view an expanded list including various options that can be selected for defining each market model parameter. In the example shown in FIG. 3A, the aforementioned list control elements may be used by the brand manager to define the following market model parameters/filters: a geographic region or location, e.g., country, state, province, city or other designated geographic territory or area of interest (using list control element 320A); a search channel or source of search data to be aggregated and processed, e.g., images or videos in an online media file repository, news sources, product databases (using list control element 340A); a time increment for specifying the level of granularity or length of the time period for which the market analysis is to be performed (using list control element 330A); and a starting time period (using list control element 335A) that is based on the defined period length or time granularity (e.g., as selected via list control element 330A). The relevant time period options listed for list control element 330A may include, for example, quarterly, semi-annual or annual. Accordingly, the options for starting time period as listed in an expanded view of list control element 335A may be updated based on the selected time period length in list control element 330A.

Referring back to FIG. 1, interface 300 of FIGS. 3A-3C may be provided by, for example, data system 130 of network environment 100, as described above. In some implementations, the interface may be provided to a marketer or brand manager associated with client 110 via a standalone application executing at client 110. The interface also may be provided by data system 130 as, for example, a web service over network 120. The web service may be accessible through, for example, one or more web pages loaded within a web browser executable at client 110 or other device (not shown) associated with the marketer/brand manager. In some implementations, a portion of the interface 300 or other interface may be used to present various interactive visualizations to the brand manager. For example, data system 130 may provide such visualizations using different market or brand analysis techniques that may be applied to search interest data associated with a structured search market or market model, e.g., created using interface 300, as described above with respect to FIGS. 3A-3C.

VI. Interactive Visualizations for Brand Analysis

FIGS. 4A-4D, 5A-5B and 6-9 ("FIGS. 4A-9") illustrate example implementations of various interactive visualizations of search interest data for brand analysis with respect to different brands in a market. Although the example visualizations of FIGS. 4A-9 will be described in the context of different interfaces, it should be noted that these example visualizations may be provided within a single interface (e.g., as different windows or pages). For example, the interactive visualizations may be presented to a brand manager via, for example, interface 300 of FIGS. 3A-3C, as described above, at a computing device (e.g., client 110 of FIG. 1, as described above) associated with the brand manager. For example, the interactive visualizations may be used by the brand manager to discover market insights or gain a better understanding of a given market and its dynamics. For purposes of explanation, FIGS. 4A-9 will be described using network environment 100 of FIG. 1 and interface 300 of FIGS. 3A-3C, as described above, but the interactive visualizations of FIGS. 4A-9 are not intended to be limited thereto. Thus, for example, the interactive visualizations of FIGS. 4A-9 may be generated based on the structured search market or market model created using interface 300 for brands in an automotive market, as described above. Like the examples illustrated in FIGS. 3A-3C, FIGS. 4A-9 are not intended to be limited thereto, and thus, may be applicable to any market or category of search interest data.

A. Example Visualization: Brands Map

FIGS. 4A-4D illustrate different views of an interface 400 for an example interactive visualization, in which a brands map representing different automotive brands in a real-world automotive market is provided. Using the example market model described above with respect to FIGS. 3A-3C, the brands in the example brands map visualization of FIGS. 4A-4D may be associated with the "Autos & Vehicles" market category, as shown in FIG. 3B and described above. The visualized brands map may include, for example, automotive brand names from a pre-defined list of the major automotive brands in the automotive industry or market (e.g., the list of brands displayed within input field 308C of interface 300, as shown in FIG. 3C and described above).

Figure 4A:
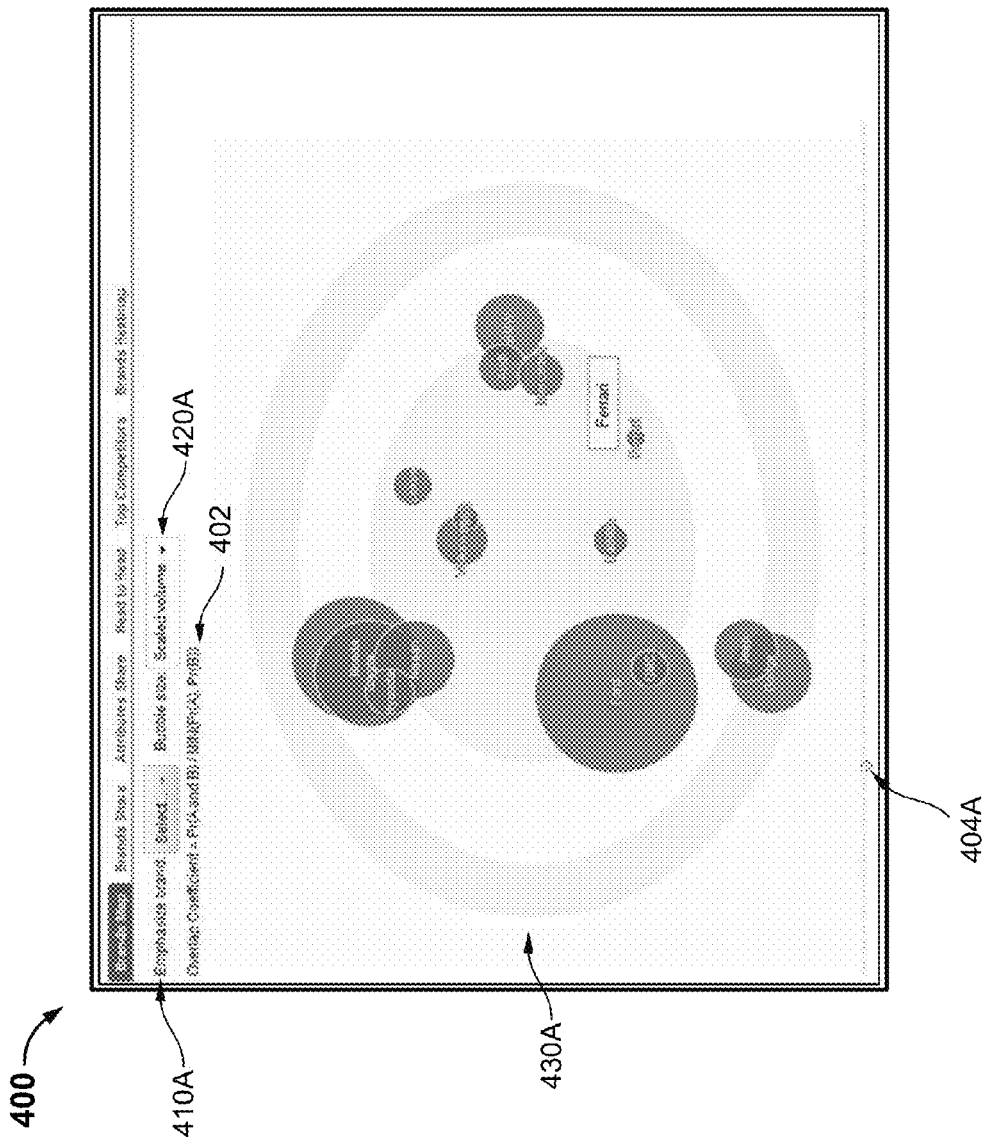
FIGS. 4A-4D illustrate an example interactive visualization of a conceptual map of different brands in a market segment based on search interest data.
Figure 4B:
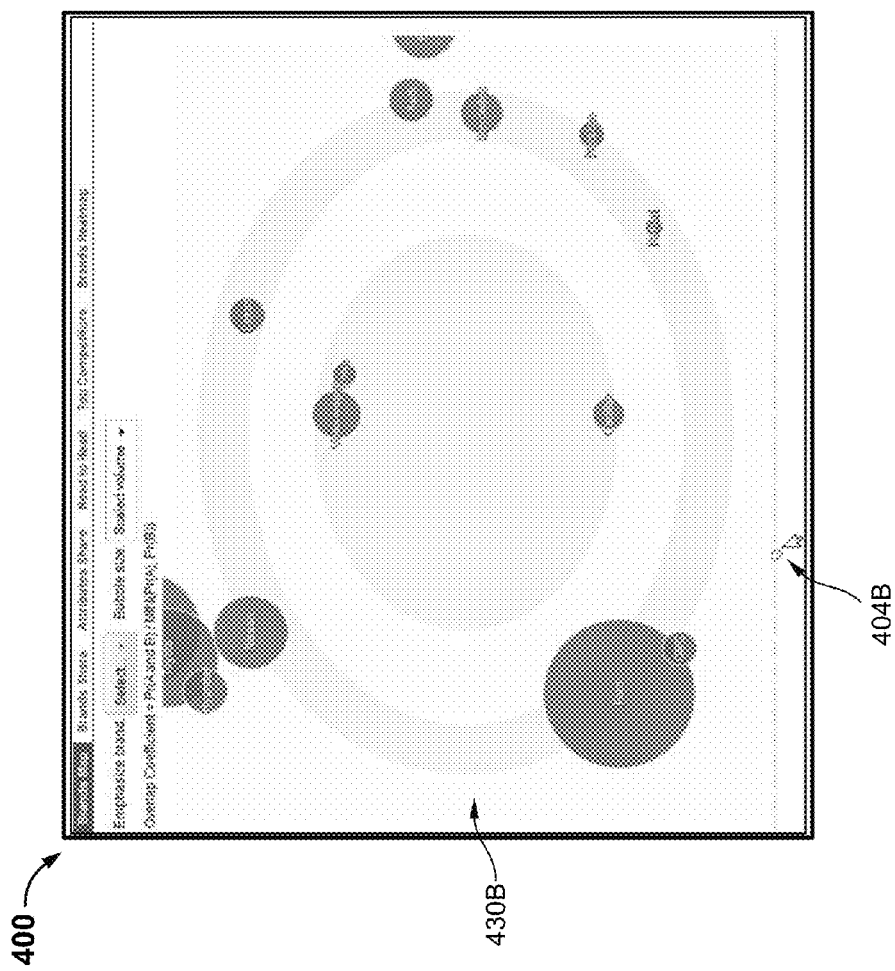

For example, the brands map may be used to provide different views of an associations matrix between the different brands and/or brand attributes. In some implementations, a two-dimensional representation of the brands map may include circle shapes and a three-dimensional representation of the brands map may include spherical shapes or bubbles representing the brands. As shown in the example of FIG. 4A, the brands map may be visualized in a content area 430A of interface 400 as a bubble map, where each of the relevant brands are represented by a circle or bubble shape. Further, interface 400 may include a control 404A (e.g., a slider control) allowing a user to change a zoom level at which the brands map is displayed in the content area. For example, FIG. 4B shows a view of the brands map at a higher zoom level in a content area 430B after the user changed a position of control 404A to a different position corresponding to control 404B (e.g., moved the slider control in a direction that increases the zoom level). The user may interact with interface 400, including control 404A/404B and other control elements, using any of various user input devices (e.g., mouse or touch-screen), as described above with respect to client 110 of FIG. 1.

The relative positions of the brands (or bubbles shapes representing the brands) in the brands map in FIG. 4A, particularly with respect to the distances between different brands in the brands map as visualized in content area 430A, may be based on similarity metrics formulated for the brands based on search interest data associated with the automotive market model, as described above with respect to method 200 of FIG. 2. Further, one or more statistical analysis techniques including, but not limited to, Multi-Dimensional Scaling (MDS) or Clustering Analysis may be used to generate the brands map. As described above, the similarity or distance metrics may represent a search-based distance between different brands in an automotive market model. For example, the similarity or distance relation between brands may be based on a probability or likelihood of co-occurrences of searches for the respective brands at adjacent times (e.g., occurring in adjacent user searches within a relatively short time proximity). Thus, users may be more likely to search for any two brands having a greater similarity relation (or less distance) between them in the same search session or even in the same search query, in comparison with a combination of two brands that are located farther away from each other in the brands map. Further, there may be a greater chance that brands appearing closer in distance relative to other brands represented on the brands map are competitors in the same user context. FIG. 4A shows an example expression 402 that may be used in determining the similar/distance relation between brands.

Figure 4C:
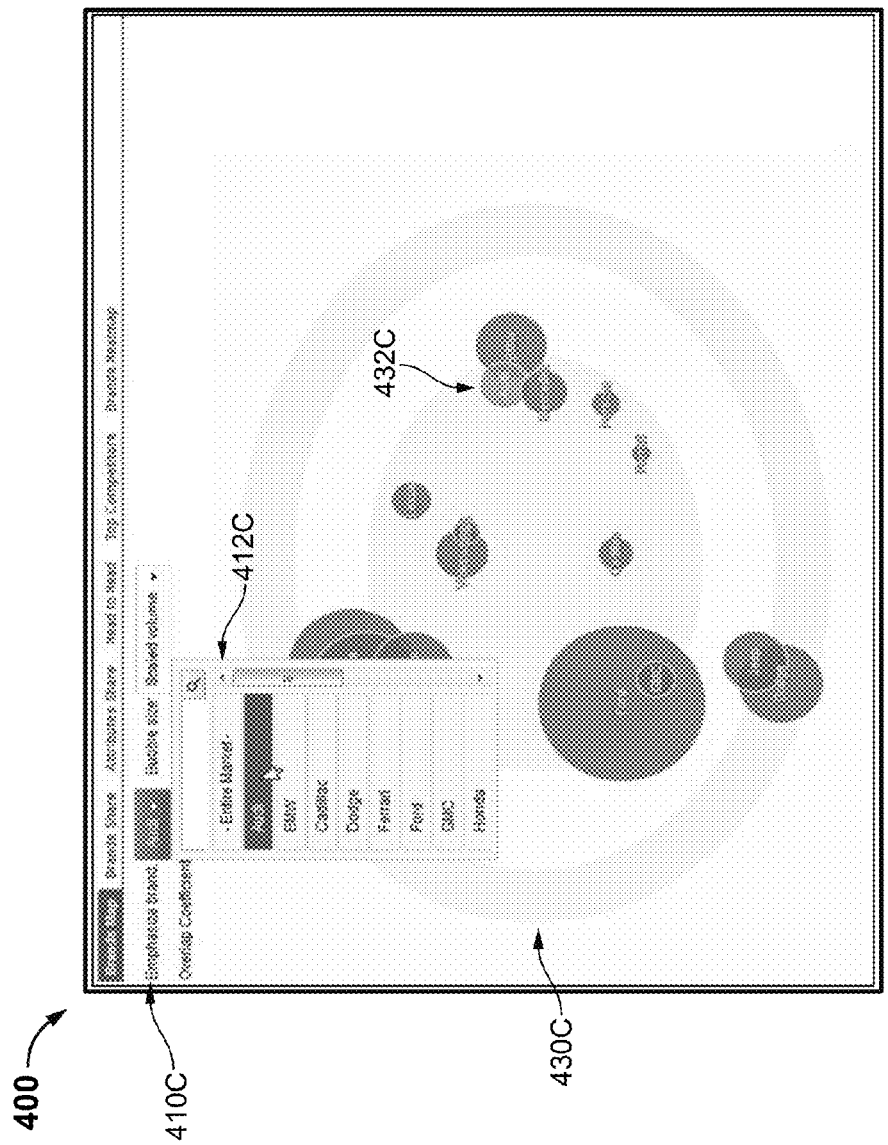

As shown by the example in FIG. 4A, interface 400 may include a list or selector control 410A and a selector control 420A. Selector control 410A may be used to select a particular brand to emphasize within the brands map as visualized in content area 430A. FIG. 4C shows an example in which the user has selected a particular brand in the brands map to emphasize relative to others. As shown in FIG. 4C, the user may select the brand from a list of brands displayed in a list box (or expanded list control) 412C, after selecting the selector control 410C. The emphasized brand may be represented in any of various ways so as to distinguish the brand from the other brands displayed in the brands map. For example, the emphasized brand may be represented with a different-colored bubble than the bubbles for the other brands, as shown by bubble 432C in content area 430C of FIG. 4C. In some implementations, different color variations may be used in the visualized brands map to distinguish brands based on, for example, a brand category (e.g., brands in different brand categories are displayed in different colors) or based on whether the brand is from a predefined list of brands or brand categories or was defined by the user.

Figure 4D:
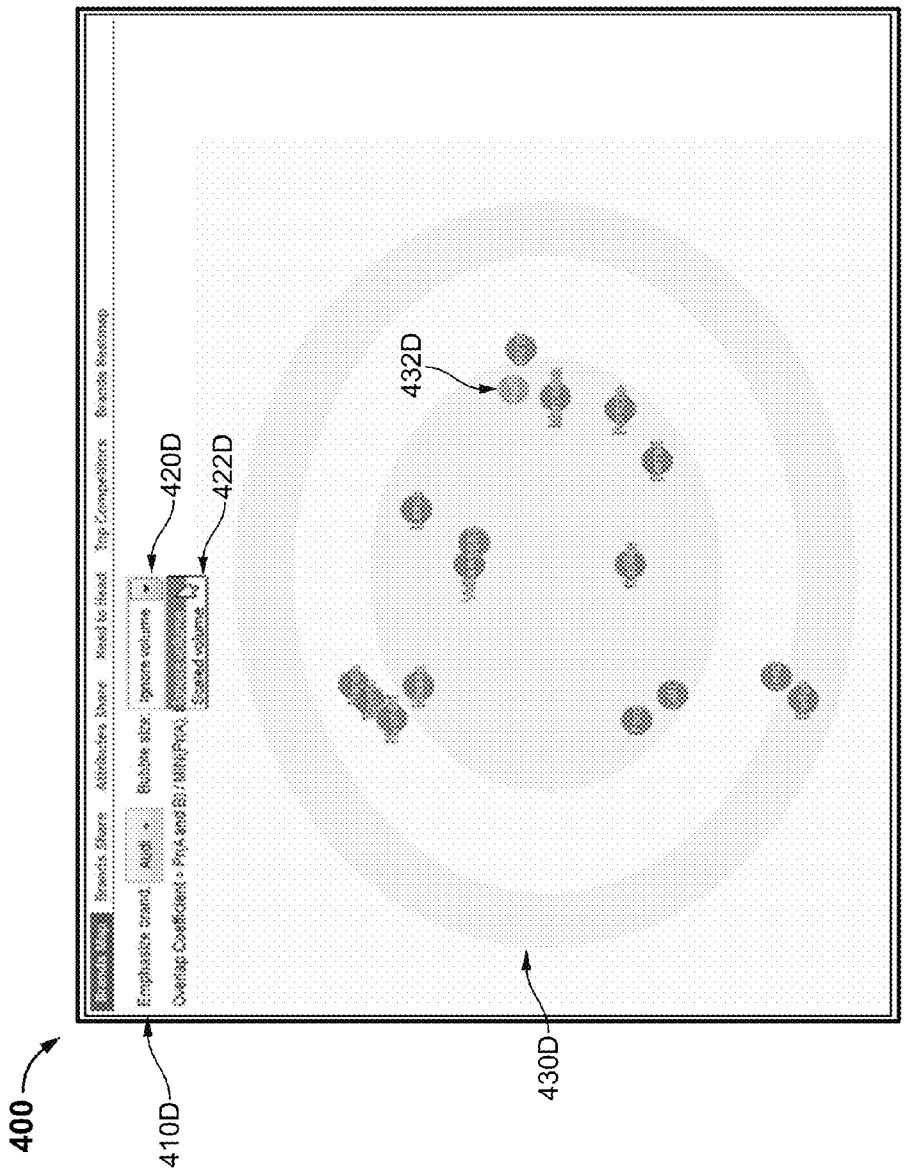

Returning to FIG. 4A, the size of the bubbles depicted for the brands in the brands map may be changed using selector control 420A. The size of each bubble may represent, for example, a scaled search volume for the corresponding brand in the automotive market model. Thus, the visualized brand map enables the user to compare relative search volumes among the different brands. For example, the user may determine which of the brands has the greatest relative search volume (e.g., "Ford") or has the least search volume (e.g., "Ferrari") by viewing the visualized brands map in content area 430A. The user may also have the option to view the brands map without taking search volume into account. As shown in the example of FIG. 4D, the user may choose to ignore volume for the brands represented in the visualized brands map by selecting the appropriate option in list box 422D of selector control 420D. The bubbles for the brands in the brands map as displayed in content area 430D are adjusted accordingly. Although the bubble sizes in the visualized brands map of the example interface 400 of FIGS. 4A-4D have been described as representing search volume, it should be noted that in other example, the bubble sizes may be used to represent other aspects of the search data for the list of brands in the market model. In some implementations, the bubble size may represent a level of search interest for the brands (e.g., across all search categories).

B. Example Visualization: Brands Share

Figure 5A:
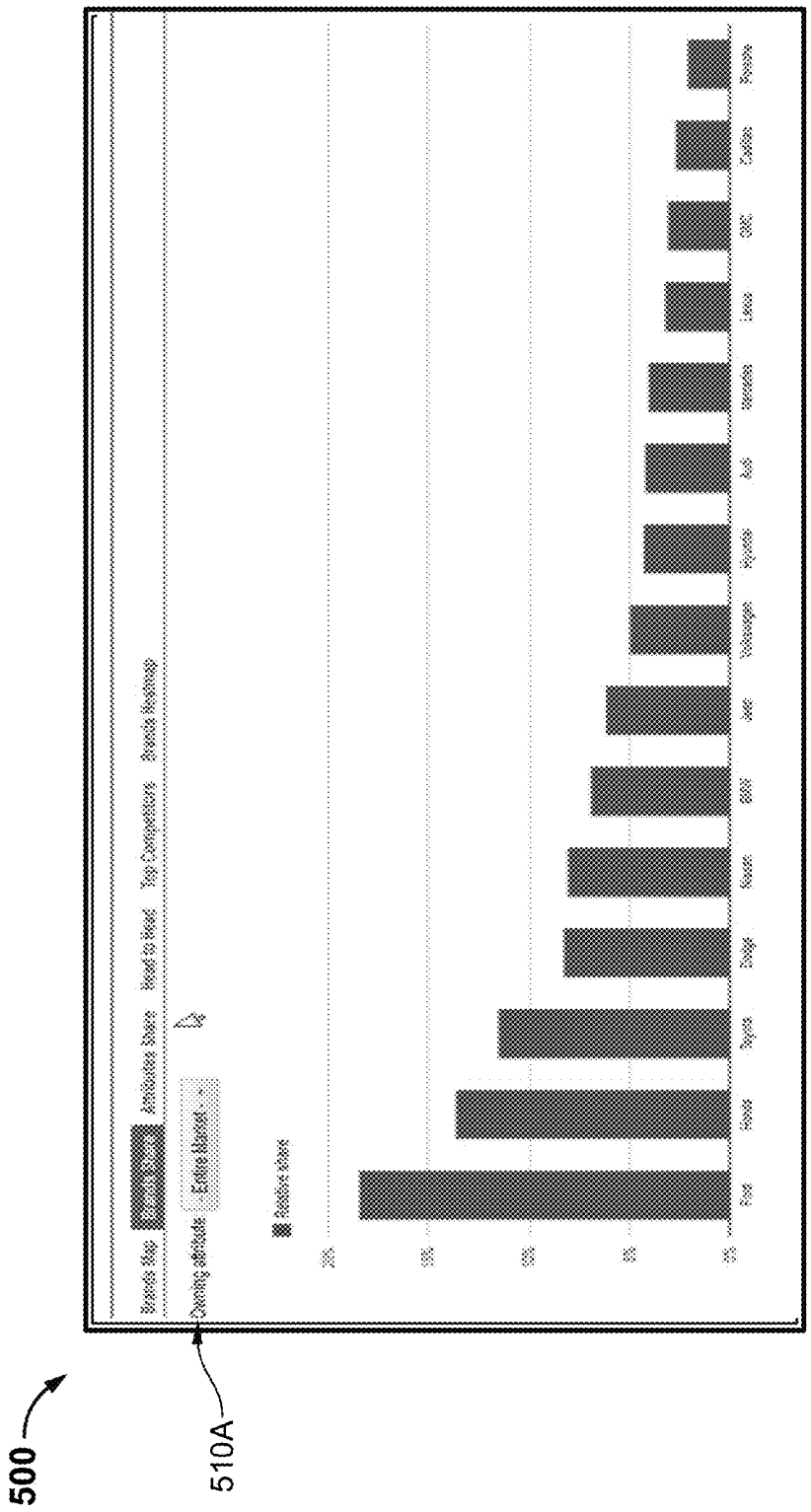
FIGS. 5A-5C illustrate an example visualization showing the distribution of search interest between different brands and one or more brand attributes in a market based on search interest data.
Figure 5B:
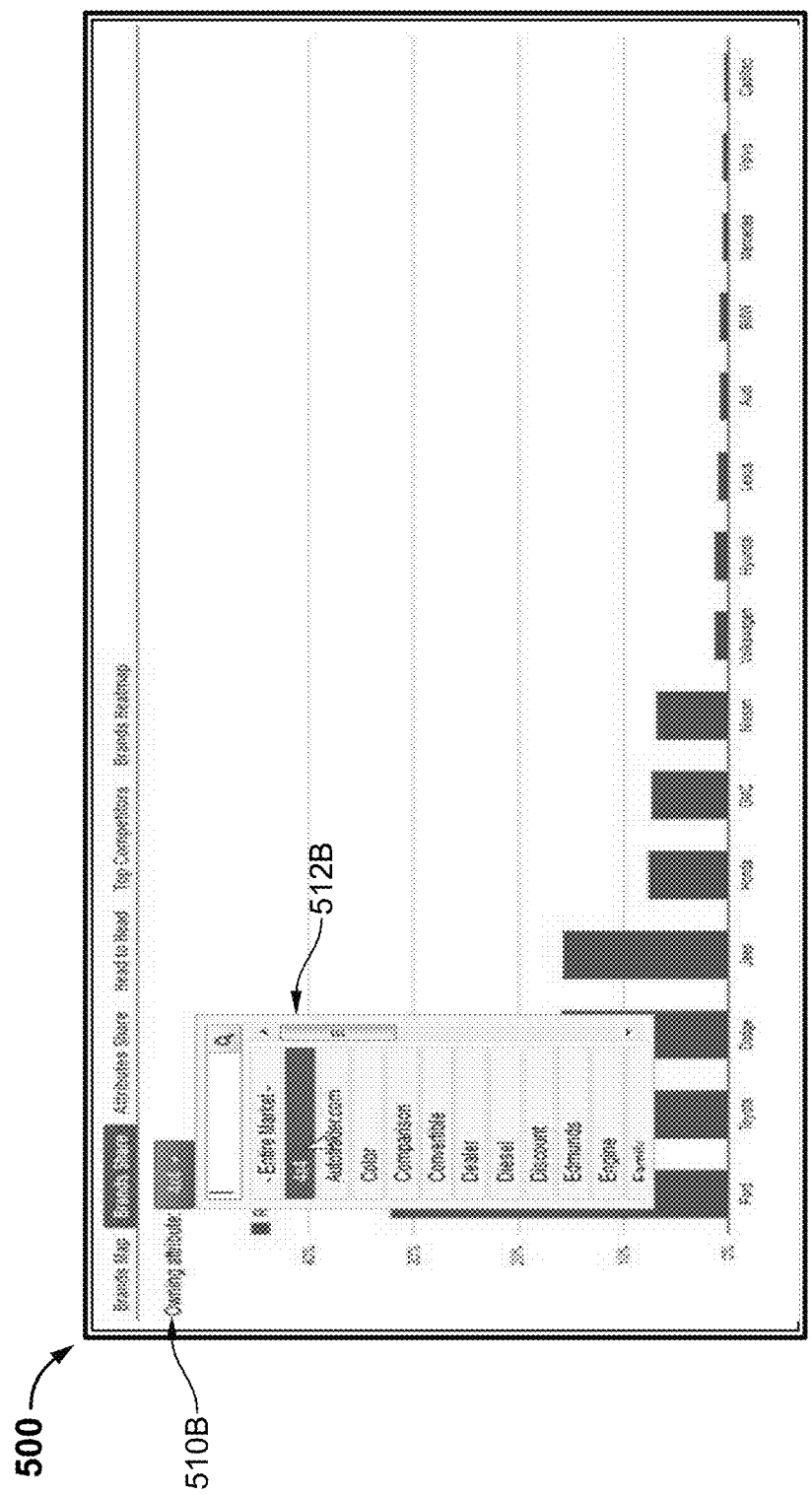
Figure 5C:
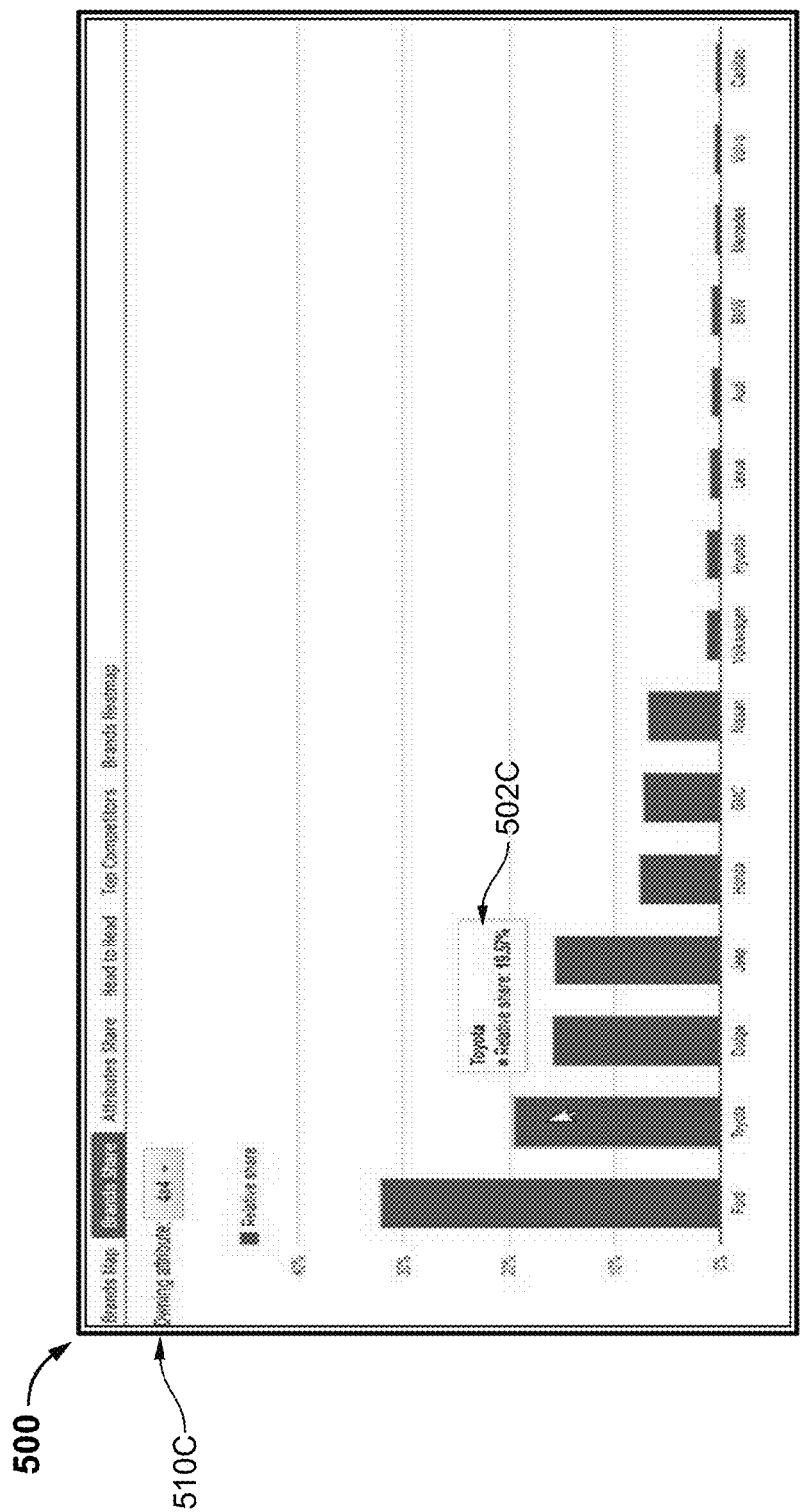

FIGS. 5A-5C show different views of an interface 500 for another example interactive visualization for the automotive market model described above. As shown in FIG. 5A, the example visualization may be used to show how overall search interest with respect to the entire market (e.g., including all attributes) is distributed across the different brands competing in the market. The share of search interest for the brands may be visualized as a bar graph, where the height of each bar in the bar graph represents the relative share of search interest for each competitor brand with respect to all attributes in the market as a whole. The relative share may be represented as, for example, the fraction of search interest for a brand given that a search for any relevant attribute associated with the market has occurred relative to all the brands in the market. Also, as shown in FIG. 5A, interface 500 may include a list or selector control 510A allowing the user to select a particular attribute from the list of attributes defining the market model in this example. For example, as shown in FIG. 5B, selector control 510B may be expanded to display a list of attributes within a list box 512B. The user may select an attribute of interest from the displayed list of attributes. Accordingly, FIG. 5C shows another view of interface 500 in which the visualized brands share graph has been updated to reflect the user's selection of the attribute. Also, as shown in FIG. 5C, interface 500 may enable the user to view a numerical value for the relative share of a particular brand (e.g., in a text box or pop-up window 502C) by selecting (using a user input device) the bar in the bar graph corresponding to the particular brand.

C. Example Visualization: Attributes Share

Figure 6:
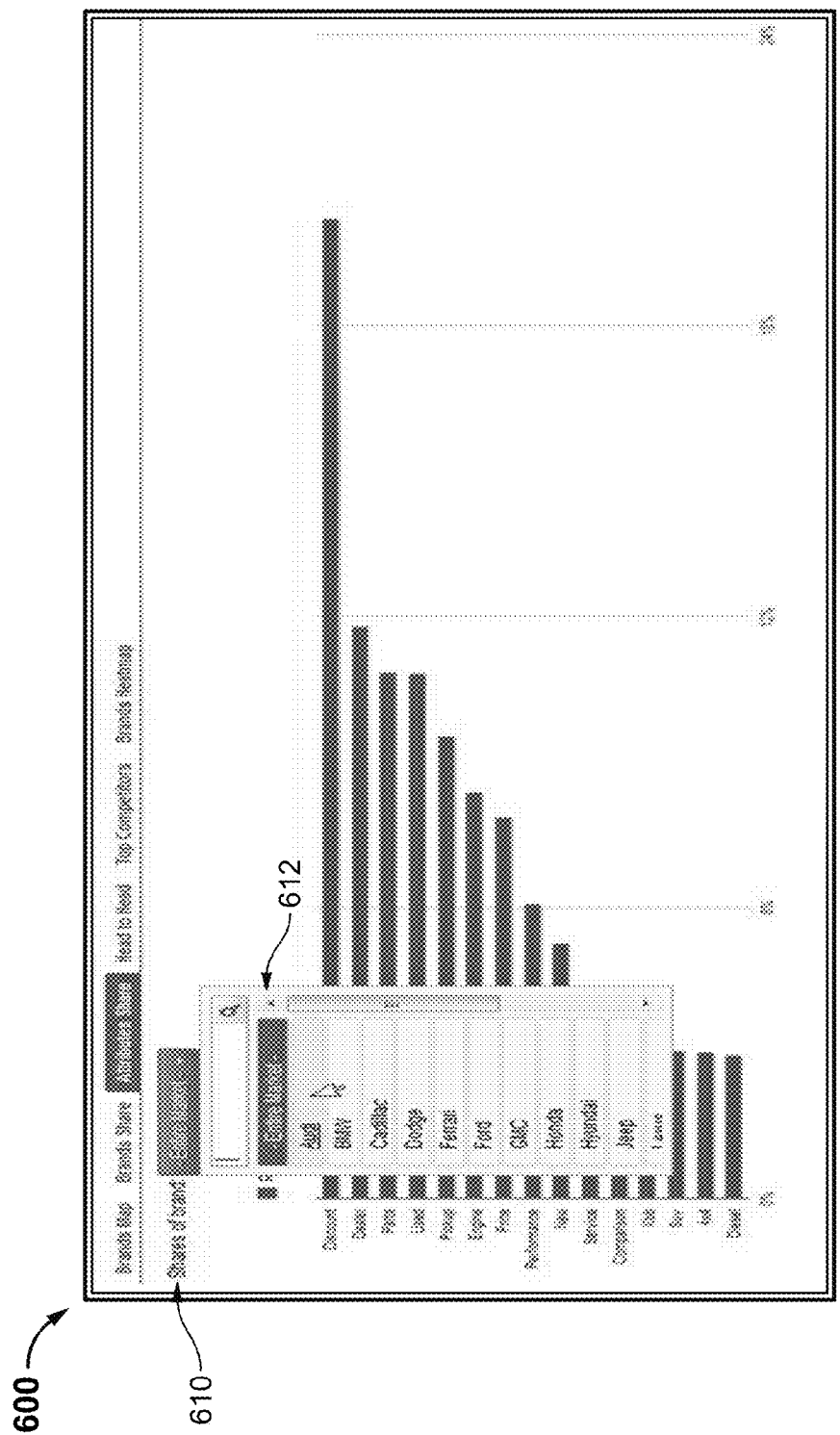
FIG. 6 illustrates an example interactive visualization showing the distribution of search interest across the different attributes with respect to one or more brands in a market.

FIG. 6 shows an interface 600 for another example interactive visualization showing the distribution of search interest across the different attributes with respect to one or more brands in the market. Similar to the example visualization of brands share, as shown in FIGS. 5A-5C and described above, the share of search interest for the attributes may be visualized as a bar graph. However, the height of each bar in the bar graph represents the relative share of search interest for each attribute with respect to either all brands or a particular bran in the market. The relative attribute shares may be represented as, for example, the fraction of search interest for an attribute given that a search for one or more brands within the market has occurred. Also, interface 600 for the attributes share visualization may provide similar functionality as that of the brands share visualization in the previous example of FIGS. 5A-5C, as described above. In the example shown in FIG. 6, interface 600 may allow the user to select a brand of interest from a list of brands displayed in a list box 612 associated with a selector control 610.

D. Example Visualization: Head-to-Head Brand Comparison

Figure 7:
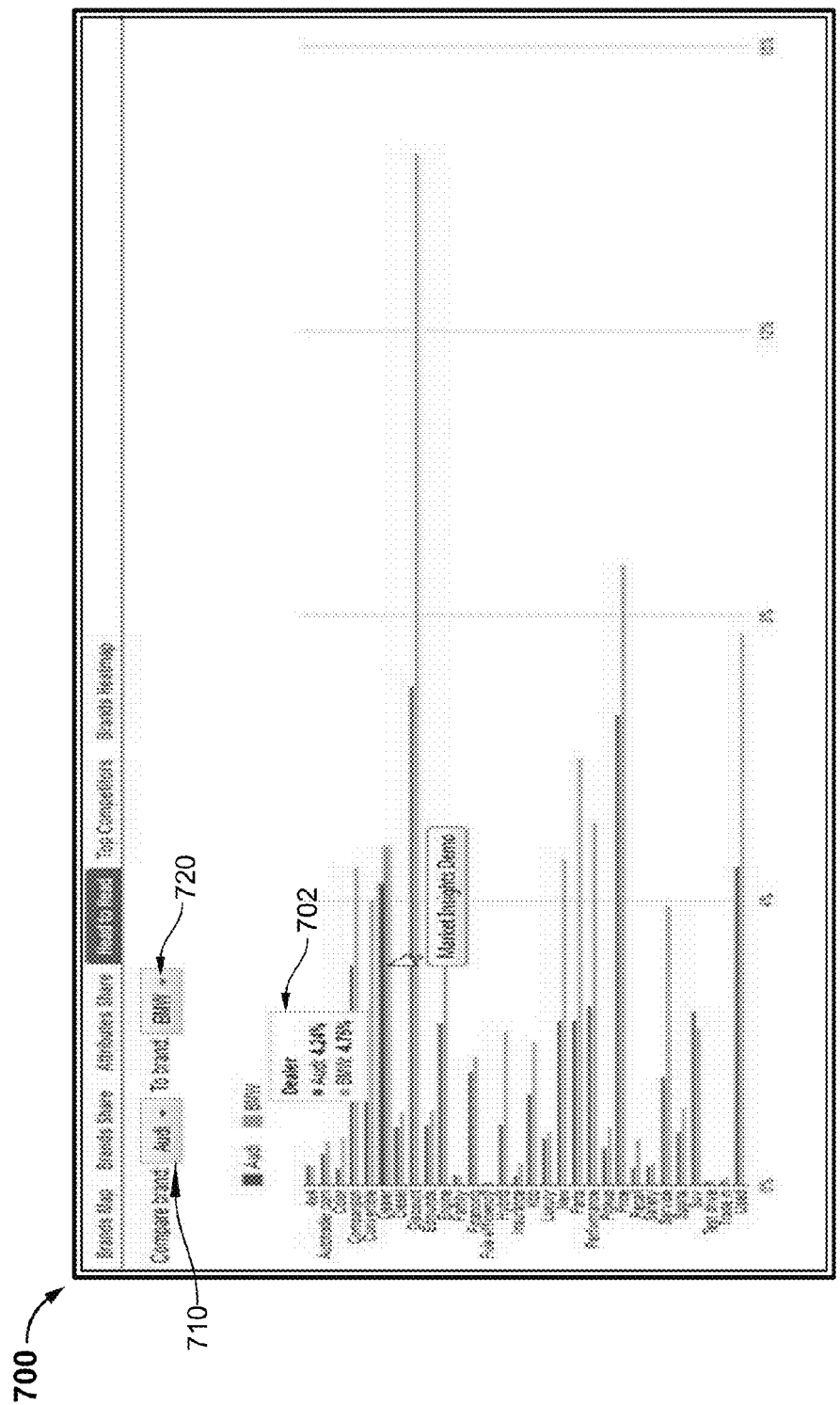
FIG. 7 illustrates an example interactive visualization of a head-to-head comparison of search interest between different brands with respect to each attribute in a list of attributes for a market.

FIG. 7 shows an interface 700 for another example interactive visualization, which shows a head-to-head comparison of two different brands with respect to all attributes. A benefit of such an interactive visualization includes enabling the user (e.g., brand manager) to identify specific attributes as the key sources of competition between different competing brands. In addition, such an interactive visualization enables the user to identify the relative share of these key attributes with respect to search interest in a given market or market segment. As shown in the example of FIG. 7, interface 700 includes selector controls 710 and 720 for enabling the user to specify each of the brands to compare. Although, the example visualization of FIG. 7 is shown as a horizontal bar graph, the interactive visualization for head-to-head brand comparisons may be implemented using other types of graphs (e.g., scatter plot) as may be desired. Like the previous example visualizations, interface 700 may enable the user to interact with the visualization to view additional information with respect to, for example, a particular brand. As shown in FIG. 7, interface 700 may be configured to display a pop-up window 702 that shows numerical values for the respective interest shares of the brands being compared with respect to an attribute by selecting a portion of the visualization corresponding to that attribute.

E. Example Visualization: Top Competitors

Figure 8:
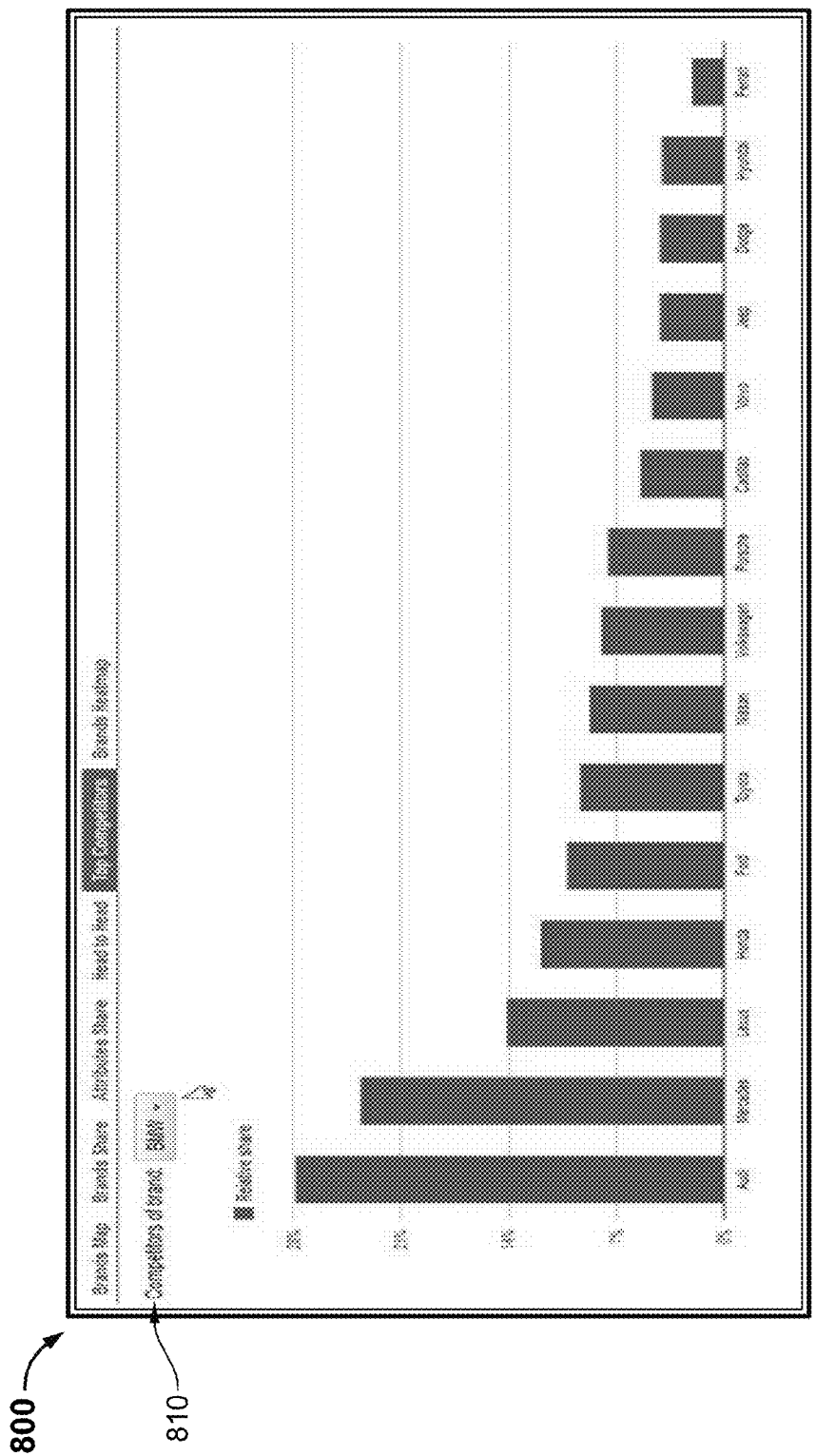
FIG. 8 illustrates an example interactive visualization of the relative shares of search interest for all brands competing with a given brand in a market.

FIG. 8 shows an interface 800 for another example interactive visualization, which shows a chart (e.g., bar graph) of the relative shares of search interest for all brands competing with a given brand in the market. As shown in FIG. 8, a particular brand of interest to the user may be selected using a selector control 810 (e.g., from a list of brands that may be displayed in association with selector control 810). Once selected, the bar graph will be visualized to show the relative interest shares distributed among the different brands competing with the user-selected brand. In some implementations, the bar heights of the bar graph in the example may be scaled such that the competitor brand having the greatest relative share is assigned a predetermined maximum share value (e.g., 100%), and the other competing brands are scaled accordingly.

F. Example Visualization: Brands Heat Map

Figure 9:
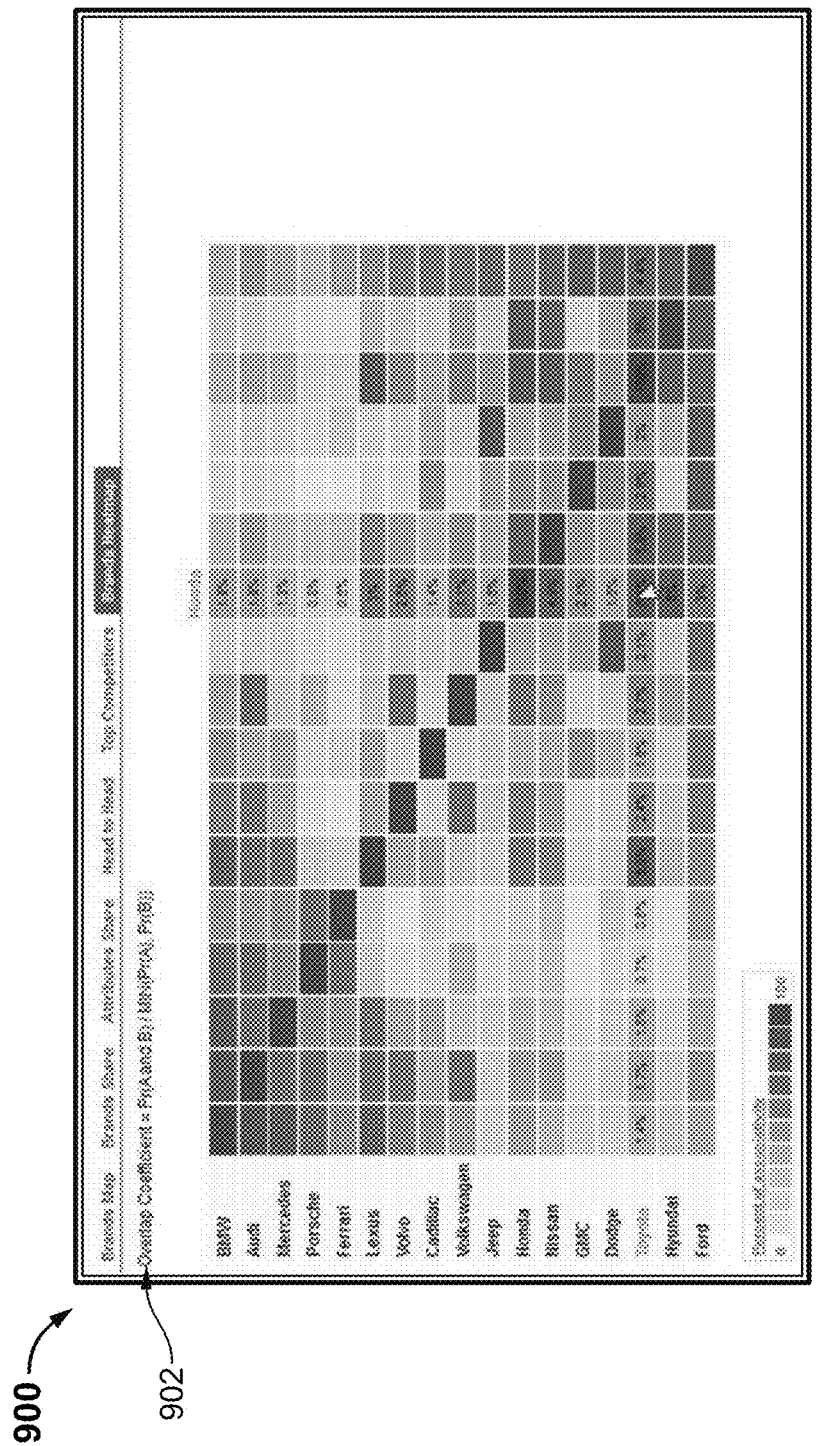
FIG. 9 illustrates an example interactive visualization of a heat map showing the relative similarity between different brands in a market based on search interest data and co-occurrences of searches related to the brands.

FIG. 9 shows an interface 900 for another example interactive visualization of a brands heat map. As shown in the example of FIG. 9, the visualized brands heat map includes a mapping of the relative similarity of each brand in comparison with all other brands in the market (e.g., in the list of predefined brands for the automotive market model, as described above). Also, as shown in FIG. 9, the brands are listed across both X and Y axes of the heat map, and a percentage representing the relative similarity between any two brands in the market is provided at each intersection point of the map. A percentage value of 100% denotes an intersection of the same brand. The percentage may be calculated based on, for example, the similarity or distance relation between brands, as described above. For example, the percentage may represent a probability or likelihood of co-occurrences of searches for the respective brands at adjacent times (e.g., occurring in adjacent user searches within a relatively short time proximity). Like the example brands map visualization of FIGS. 4A-4D described above, the visualized heat map of FIG. 9 may be based on an expression 902 that represents the similarity/distance relation between any brand ('A') and any other brand ('B'). In some implementations, the heat map may be displayed using a range of different colors (or different shades of the same color) to represent the degree of similarity between different brands based on their respective similarity/distance percentages. The order of the rows or columns in the heat map can be chosen based on, for example, output scores generated using any of various data analysis techniques including, but not limited to, Principle Components Analysis or Clustering Analysis. In this way, the visualized heat map can be used to demonstrate the structure of the given market. In the example heat map as shown in FIG. 9, the order of the rows and columns were selected so as to follow the first axis of the example brand map as shown in FIGS. 4A-4D, as described above, thereby preserving the same market clusters as shown in the brand map.

VII. Defining a Campaign for Campaign Analysis

Figure 10A:
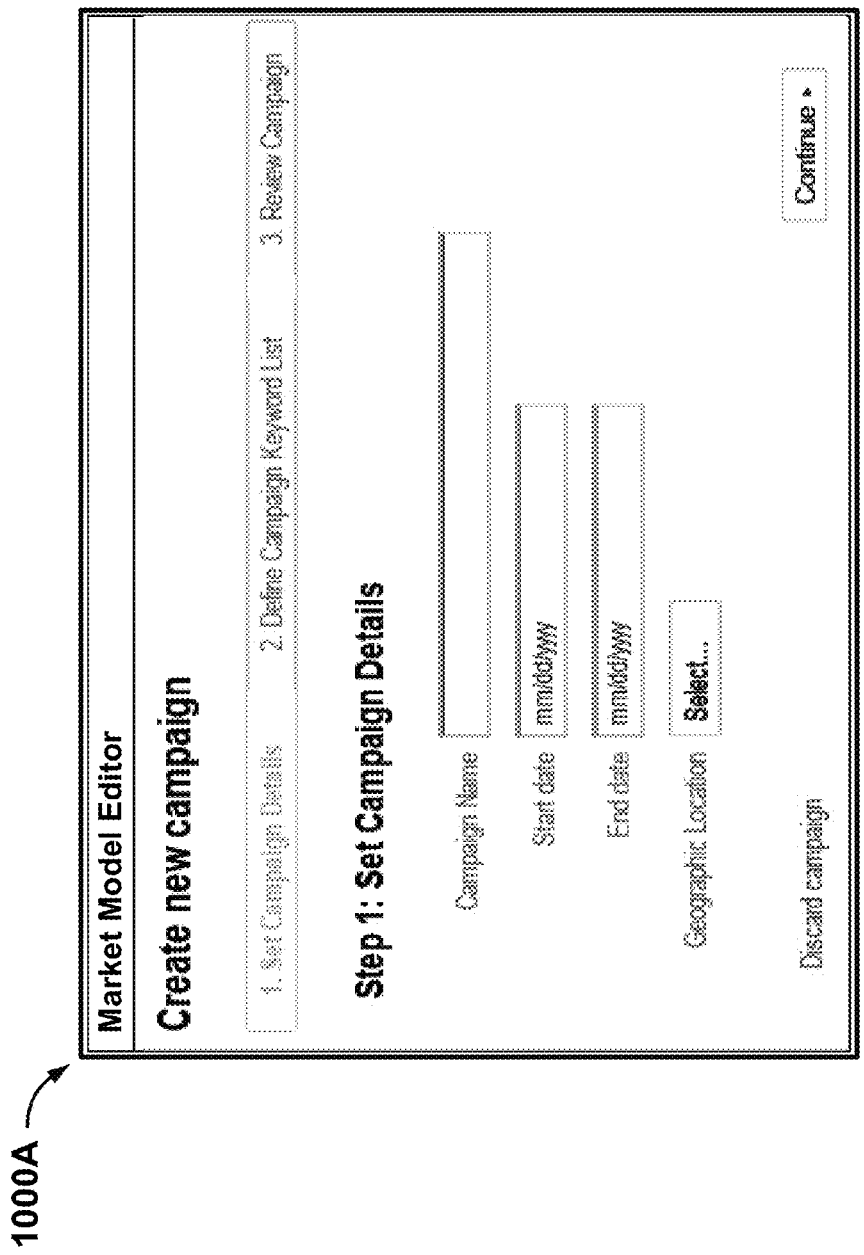
Figure 10B:
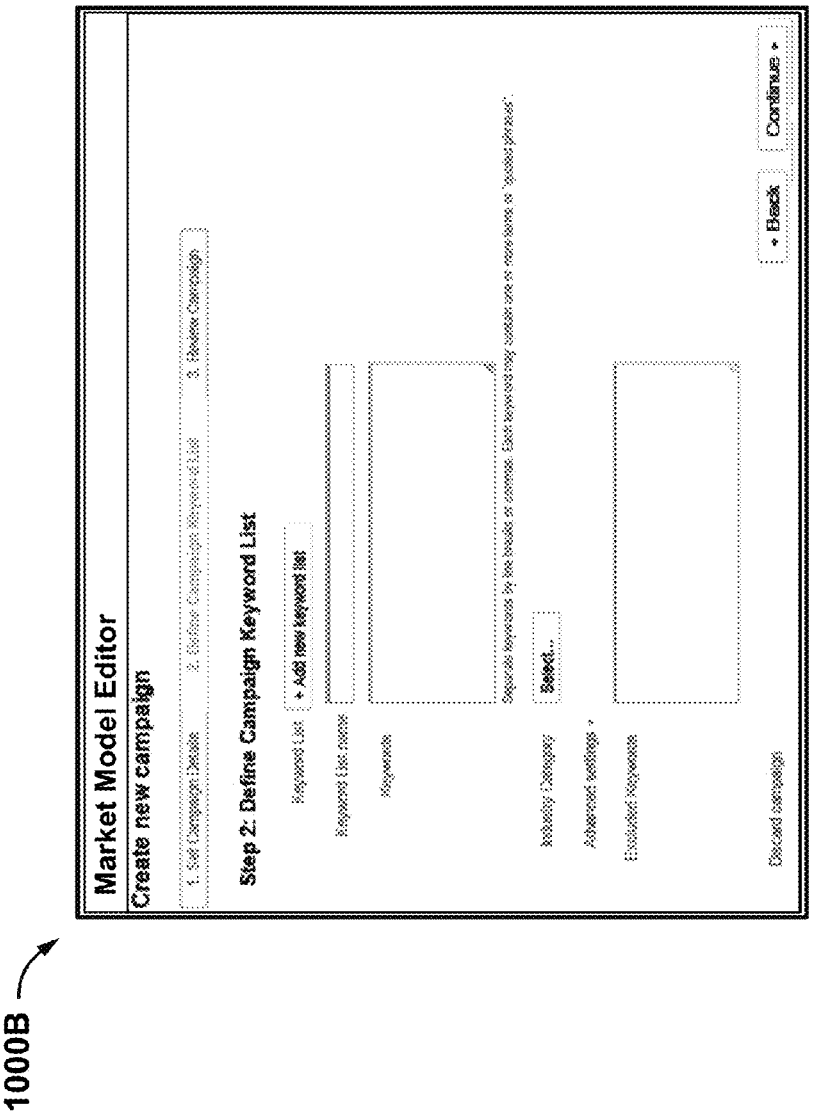

FIGS. 10A-10C illustrate different screens or pages of an example interface (collectively referred to as "1000A-C") for modeling a real-world market based on search interest data in order to perform market campaign analysis. In some implementations, interface 1000A-C may be included along with interface 300 in a set of marketing analysis tools to enable a brand manager to switch between each interface by selecting different user interface controls (not shown) for either campaign analysis or brand analysis. As shown by the example in FIGS. 10A-10C, interface 1000A-C may be used to create a new campaign (e.g., new advertising or marketing campaign). For example, a brand manager may use the first page of the interface 1000A, as shown in FIG. 1000A, to indicate a name for the campaign, geographic location and a time period for introducing a new campaign. The second page of the interface, as shown in FIG. 10B, may be used to define the relevant keywords for the campaign. In an example, the brand manager can specify that the campaign be introduced if a level of web search interest for a particular term (e.g., brand) or groupings of terms (e.g., brand attribute) exceeds a predefined threshold. Further, the brand manager may specify that certain campaigns be used only in particular geographic markets or during certain time periods.

As described above, search interest metrics may be used to discover current trends with respect to a marketing campaign. For example, the search interest trend related to a brand that is the subject of a new promotional advertising/marketing campaign may be compared with other trends during a predetermined time period relative to a baseline. The baseline may be established, for example, in terms of a previous campaign during an initial or previous time period. For example, the initial or previous time period may be for the same increment of time, but correspond to a different year with respect to the general market or particular market category.

VIII. Interactive Visualization for Campaign Analysis

Figure 11:
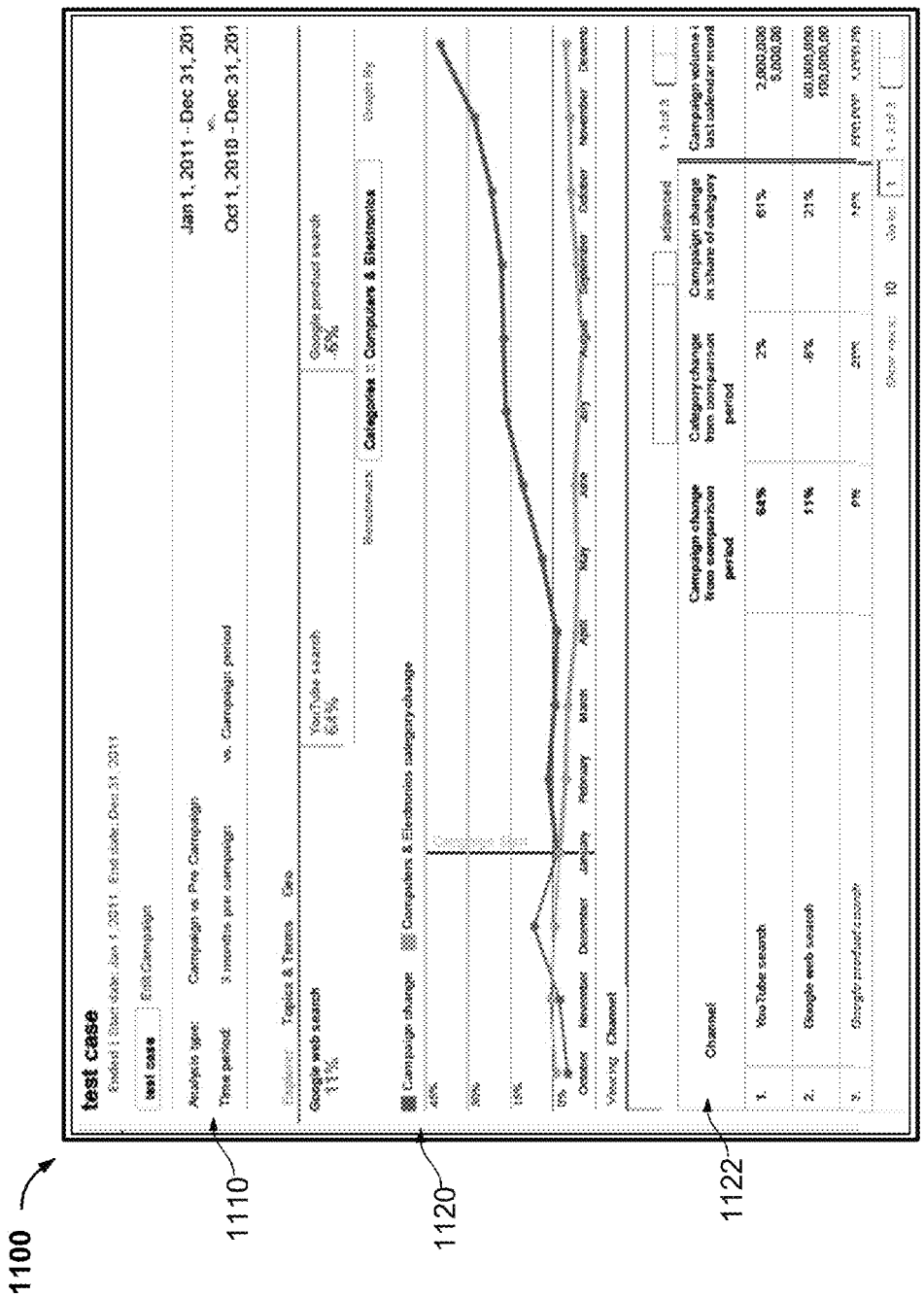
FIG. 11 illustrates an example interactive visualization showing a comparison of different campaigns over different time periods and sources of search interest data.

FIG. 11 shows an example visualization for campaign analysis with a chart 1120 including a time series that represents a current change of trend of online search interest for a campaign related to the "computers and electronics" market category during a specified time period in year 2011 relative to a previous time period in year 2010. The current change of trend of online search interest may be determined by calculating a difference between a predetermined trend of online search interest during the initial or previous time period (e.g., corresponding to a "pre-campaign") and the current trend of online search interest during the specified time period corresponding to the campaign. Additionally, a second time series representing a change in the general trend of online search interest for the market category related to the campaign may also be provided. Further, the interactive visualization includes a chart 1122 showing a comparison of search interest across different sources or channels of search data including, for example and without limitation, product search queries, web search queries and media search queries. Accordingly, the brand manager may use the visualized information for campaign analysis in order to assess previous campaigns or introduce new marketing campaigns based on changing trends.

IX. Example Computer System

Figure 12:
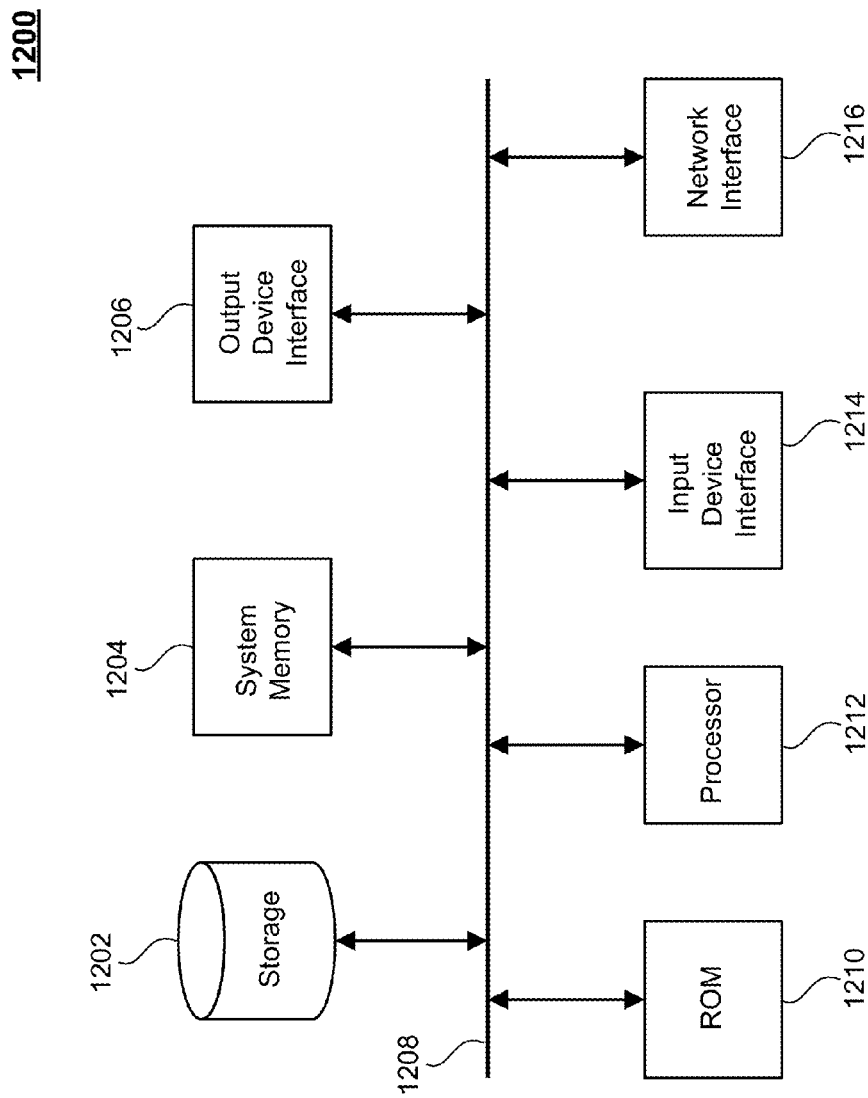
FIG. 12 conceptually illustrates an example electronic system in which some configurations are implemented.

FIG. 12 conceptually illustrates an example electronic system 1200 with which some implementations of the subject technology are implemented. For example, any of the various computing devices (e.g., client 110, computing system 130 or web server 140) of network environment 100 of FIG. 1, as described above, may be implemented using electronic system 1200. Electronic system 1200 can be a computer, phone, PDA, or any other sort of electronic device. Such an electronic system includes various types of computer readable media and interfaces for various other types of computer readable media. Electronic system 1200 includes a bus 1208, processing unit(s) 1212, a system memory 1204, a read-only memory (ROM) 1210, a permanent storage device 1202, an input device interface 1214, an output device interface 1206, and a network interface 1216.

Bus 1208 collectively represents all system, peripheral, and chipset buses that communicatively connect the numerous internal devices of electronic system 1200. For instance, bus 1208 communicatively connects processing unit(s) 1212 with ROM 1210, system memory 1204, and permanent storage device 1202.

From these various memory units, processing unit(s) 1212 retrieves instructions to execute and data to process in order to execute the processes of the subject disclosure. The processing unit(s) can be a single processor or a multi-core processor in different implementations.

ROM 1210 stores static data and instructions that are needed by processing unit(s) 1212 and other modules of the electronic system. Permanent storage device 1202, on the other hand, is a read-and-write memory device. This device is a non-volatile memory unit that stores instructions and data even when electronic system 1200 is off. Some implementations of the subject disclosure use a mass-storage device (such as a magnetic or optical disk and its corresponding disk drive) as permanent storage device 1202.

Other implementations use a removable storage device (such as a floppy disk, flash drive, and its corresponding disk drive) as permanent storage device 1202. Like permanent storage device 1202, system memory 1204 is a read-and-write memory device. However, unlike storage device 1202, system memory 1204 is a volatile read-and-write memory, such a random access memory. System memory 1204 stores some of the instructions and data that the processor needs at runtime. In some implementations, the processes of the subject disclosure are stored in system memory 1204, permanent storage device 1202, and/or ROM 1210. For example, the various memory units include instructions for providing interactive visualizations of search interest data in accordance with some implementations. From these various memory units, processing unit(s) 1212 retrieves instructions to execute and data to process in order to execute the processes of some implementations (e.g., the steps of method 200 of FIG. 2, as described above).

Bus 1208 also connects to input and output device interfaces 1214 and 1206. Input device interface 1214 enables the user to communicate information and select commands to the electronic system. Input devices used with input device interface 1214 include, for example, alphanumeric keyboards and pointing devices (also called "cursor control devices"). Output device interfaces 1206 enables, for example, the display of images generated by the electronic system 1200. Output devices used with output device interface 1206 include, for example, printers and display devices, such as cathode ray tubes (CRT) or liquid crystal displays (LCD). Some implementations include devices such as a touch-screen that functions as both input and output devices.

Finally, as shown in FIG. 12, bus 1208 also couples electronic system 1200 to a network (not shown) through a network interface 1216. In this manner, the computer can be a part of a network of computers (such as a local area network ("LAN"), a wide area network ("WAN"), or an Intranet, or a network of networks, such as the Internet. Any or all components of electronic system 1200 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

X. Conclusion

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method comprising:
obtaining aggregate search data based on session logs of search queries submitted by users to a search engine during a predetermined time period of network search activity;
obtaining a first list of search terms corresponding to a plurality of search entities;
determining a search frequency for each search entity in the aggregate search data based on a corresponding search term in the first list of search terms;
calculating search probabilities for each search entity based on the determined search frequency of the search entity in the aggregate search data, the search probabilities indicating a likelihood of search queries related to the search entity co-occurring with search queries related to one or more different search entities;
estimating a level of search interest for each of the plurality of search entities based on the search probabilities;
generating a search market model for the plurality of search entities based on the estimated level of search interest of each search entity during the predetermined time period; and
providing an interactive visualization showing interrelations between the plurality of search entities of the generated search market model.

2. The method of claim 1, wherein the search engine corresponds to one or more sources of online search data and the session logs are obtained from the one or more sources.

3. The method of claim 2, wherein the one or more sources include a web search engine for submitting general online search queries, a product search engine for submitting online search queries for information related to consumer products or services, and a media search engine for submitting online search queries related to media content.

4. The method of claim 1, comprising:
obtaining a second list of search terms corresponding to attributes of the plurality of search entities;
determining a search frequency for each attribute in the aggregate search data based on a corresponding search term in the second list of search terms;
calculating joint search probabilities for the plurality of search entities and related attributes based on the respective search frequency determined for each search entity and each attribute, the search probabilities indicating a likelihood of search queries related to each search entity co-occurring with search queries related to each attribute during the predetermined time period;
estimating a second level of search interest for each search entity relative to one or more of the attributes based on the calculated joint search probabilities; and
generating a new search market model based on the estimated second level of search interest.

5. The method of claim 4, wherein the second level of search interest is estimated using similarity metrics based on the joint search probabilities calculated for the plurality of search entities.

6. The method of claim 4, further comprising:
providing a second interactive visualization showing interrelations between one or more of the plurality of search entities and one or more of the attributes for the new search market model.

7. The method of claim 4, wherein the first and second lists of search terms are obtained based on user input via an interface of the search engine.

8. A non-transitory machine-readable medium comprising instructions stored therein, which when executed by a processor, causes the processor to perform operations comprising:
obtaining aggregate search data based on session logs of search queries submitted by users to a search engine during a predetermined time period of network search activity;
identifying search entities based on a first list of search terms corresponding to the search entities;
identifying attributes related to the identified search entities based on a second list of search terms corresponding to the attributes;
determining a search frequency for each search entity and each attribute in the aggregate search data based on corresponding search terms in the respective first and second lists of search terms;
calculating search probabilities for the search entities and related attributes based on the respective search frequency determined for each search entity and each attribute, the search probabilities indicating a likelihood of search queries related to each search entity co-occurring with search queries related to each attribute during the predetermined time period
estimating a level of search interest for each of the search entities relative to one or more of the attributes based on the calculated search probabilities;
generating a search market model for mapping interrelations between the search entities and related attributes based on the estimated level of search interest; and
providing an interactive visualization of the interrelations between one or more of the search entities and one or more of the attributes based on the generated search market model.

9. The machine-readable medium of claim 8, wherein the level of search interest is estimated using similarity metrics based on the search probabilities calculated for the search entities and related attributes.

10. The machine-readable medium of claim 8, wherein the first and second lists of search terms are obtained based on user input via an interface of the search engine.

11. The machine-readable medium of claim 8, wherein the search engine corresponds to one or more sources of online search data and the session logs are obtained from the one or more sources.

12. The machine-readable medium of claim 11, wherein the one or more sources include a web search engine for submitting general online search queries, a product search engine for submitting online search queries for information related to consumer products or services, and a media search engine for submitting online search queries related to media content.

13. A computer-implemented method comprising:
   determining a historic trend of online search interest in a search entity based on search queries related to the search entity submitted by users to a search engine during a first time period, the search entity corresponding to one or more related search terms submitted as part of the related search queries;
   determining a current trend of online search interest in the search entity based on search queries related to the search entity submitted during a second time period; and
   providing an interactive visualization comparing the historic and current search trends of online search interest for the search entity over a time series including the first and second time periods;
   calculating a difference between the historic trend of online search interest for the search entity and a general trend of online search interest for one or more other search entities within a search category associated with the search entity during the first time period;
   calculating a difference between the current trend of online search interest determined for the search entity and the general trend of online search interest for the one or more other search entities within the search category during the second time period; and
   updating the visualization with a second time series representing a change of online search interest trends for the search entity relative to the one or more other search entities within the search category, based on the calculated differences between the general trend of online search interest for the search category and the historic and current trends of online search interest for the search entity over the second time series, the second time series including the first and second time periods.

14. The method of claim 13, wherein the current and historic trends are determined for a predetermined geographic location.

15. The method of claim 13, wherein the one or more related search terms corresponding to the search entity include a plurality of attributes related to the search entity.

16. The method of claim 13, wherein the historic and current trends of online search interest are determined based on aggregate search data derived from session logs of search queries related to the search entity from different online users during the respective first and second time periods.

17. A non-transitory computer-readable medium storing software comprising instructions executable by one or more computers which, upon such execution, cause the one or more computers to perform operations comprising:
   obtaining aggregate search data based on session logs of search queries submitted by users to a search engine during a predetermined time period of network search activity;
   obtaining a first list of search terms corresponding to a plurality of search entities;
   determining a search frequency for each search entity in the aggregate search data based on a corresponding search term in the first list of search terms;
   calculating search probabilities for each search entity based on the determined search frequency of the search entity in the aggregate search data, the search probabilities indicating a likelihood of search queries related to the search entity co-occurring with search queries related to one or more different search entities;
   estimating a level of search interest for each of the plurality of search entities based on the search probabilities;
   generating a search market model for the plurality of search entities based on the estimated level of search interest of each search entity during the predetermined time period; and
   providing an interactive visualization showing interrelations between the plurality of search entities of the generated search market model.

* * * * *